(12) United States Patent
Sebexen et al.

(10) Patent No.: US 10,127,043 B2
(45) Date of Patent: Nov. 13, 2018

(54) IMPLEMENTING CONFLICT-FREE INSTRUCTIONS FOR CONCURRENT OPERATION ON A PROCESSOR

(71) Applicant: Rex Computing, Inc., Saratoga, CA (US)

(72) Inventors: Paul Michael Sebexen, Saratoga, CA (US); Thomas Rex Sohmers, Saratoga, CA (US)

(73) Assignee: Rex Computing, Inc., Saratoga, CA (US)

( * ) Notice: Subject to any disclaimer, the term of this patent is extended or adjusted under 35 U.S.C. 154(b) by 184 days.

(21) Appl. No.: 15/298,187

(22) Filed: Oct. 19, 2016

(65) Prior Publication Data

US 2018/0107484 A1    Apr. 19, 2018

(51) Int. Cl.
*G06F 9/30* (2018.01)
*G06F 9/38* (2018.01)
*G06F 15/80* (2006.01)

(52) U.S. Cl.
CPC .............. *G06F 9/38* (2013.01); *G06F 9/3016* (2013.01); *G06F 15/80* (2013.01)

(58) Field of Classification Search
None
See application file for complete search history.

(56) References Cited

U.S. PATENT DOCUMENTS

| | | | | |
|---|---|---|---|---|
| 2002/0161986 A1* | 10/2002 | Kamigata | ............... | G06F 8/447 712/24 |
| 2005/0257027 A1* | 11/2005 | Leijten | ................ | G06F 9/30149 712/24 |
| 2009/0119489 A1* | 5/2009 | Pechanek | ............ | G06F 9/30014 712/208 |
| 2011/0022821 A1* | 1/2011 | Fei | ........................ | G06F 9/3017 712/32 |

* cited by examiner

*Primary Examiner* — Corey S Faherty
(74) *Attorney, Agent, or Firm* — Redbrick IP, P.C.

(57) ABSTRACT

A method and system for implementing very long instruction words (VLIW), the system operable to: receive a first very long instruction word (VLIW) including a set of slot instructions corresponding to a set of functional units, where: each slot instruction includes an opcode identifying an operation to be performed by the set of functional units and value fields related to the operation, where a dedicated subset of the value fields include dedicated bits dedicated to the slot instruction and an allocable subset of the value fields include allocable bits allocable to other slot instructions; identify the opcodes of each slot instruction; determine, based on the opcodes, which allocable bits are allocated to which slot instructions; and instruct each functional unit to perform an operation identified by a corresponding slot instruction using the corresponding dedicated bits and any allocable bits determined to be allocated to the slot instruction.

20 Claims, 13 Drawing Sheets

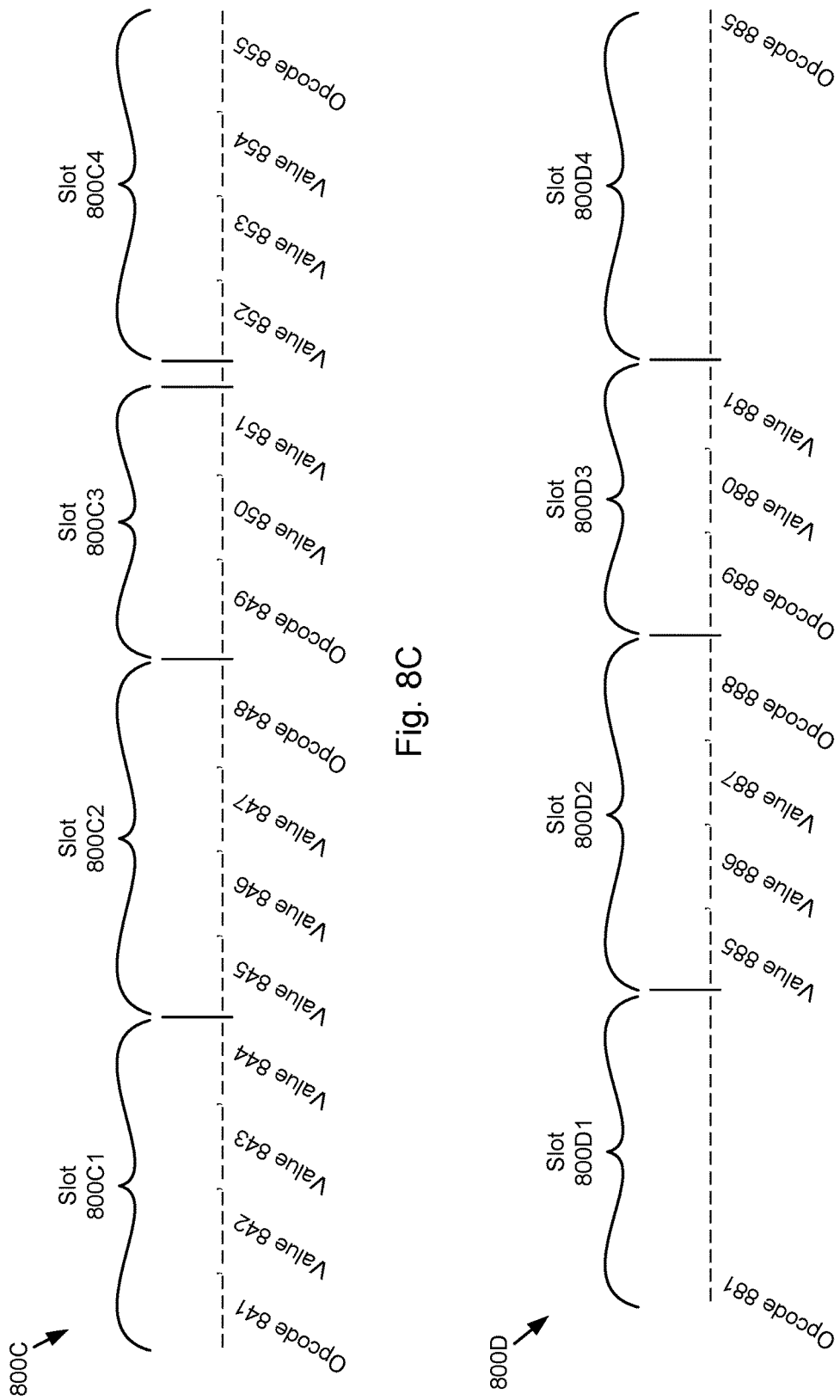

IMPLEMENTING CONFLICT-FREE INSTRUCTIONS FOR CONCURRENT OPERATION ON A PROCESSOR

CROSS-REFERENCE TO RELATED APPLICATIONS

This application is related to, and herein incorporates by reference for all purposes, U.S. patent application Ser. No. 15/298,180 (filed Oct. 19, 2016, entitled "LATENCY GUARANTEED NETWORK ON CHIP", Paul Michael Sebexen) and U.S. patent application Ser. No. 15,298,183 (filed Oct. 19, 2016, entitled "OPTIMIZATED FUNCTION ASSIGNMENT IN A MULTI-CORE PROCESSOR", Paul Michael Sebexen).

BACKGROUND

A central processing unit (CPU) is an electronic circuit that carries out the instructions of a computer program by performing the basic arithmetic, logical, control and input/output (I/O) operations specified by the instructions. The use of CPUs in electronic and other products has continued to increase, while at the same time CPUs have become smaller, faster, and less power consuming.

A multi-core processor may include two or more independent processing units, called "cores". Each core may perform similar operations as a conventional single core CPU. However, because the multiple cores can run multiple instructions at the same time, the overall speed for programs responsive to parallel computing may be increased. The multiple cores are typically integrated onto a single integrated circuit die (also known as a chip), or onto multiple dies in a single chip package.

Many different architectures are possible for single core CPUs and multi-core processors, providing different advantages in different aspects. However, there continues to be a need for faster, smaller, less power consuming, more reliable, and easier to use architectures.

SUMMARY

In general, in one aspect, embodiments relate to a system for implementing very long instruction words (VLIW), the system operable to: receive a first very long instruction word (VLIW) including a set of slot instructions corresponding to a set of functional units, where: each slot instruction includes an opcode identifying an operation to be performed by the set of functional units and value fields related to the operation, where a dedicated subset of the value fields include dedicated bits dedicated to the slot instruction and an allocable subset of the value fields include allocable bits allocable to other slot instructions; identify the opcodes of each slot instruction; determine, based on the opcodes, which allocable bits are allocated to which slot instructions; and instruct each functional unit to perform an operation identified by a corresponding slot instruction using the corresponding dedicated bits and any allocable bits determined to be allocated to the slot instruction.

In general, in one aspect, embodiments relate to a method for implementing very long instruction words (VLIW), the method including: receiving a first very long instruction word (VLIW) including a set of slot instructions corresponding to a set of functional units, where: each slot instruction includes an opcode identifying an operation to be performed by the set of functional units and value fields related to the operation, where a dedicated subset of the value fields include dedicated bits dedicated to the slot instruction and an allocable subset of the value fields include allocable bits allocable to other slot instructions; identifying the opcodes of each slot instruction; determining, based on the opcodes, which allocable bits are allocated to which slot instructions; and instructing each functional unit to perform an operation identified by a corresponding slot instruction using the corresponding dedicated bits and any allocable bits determined to be allocated to the slot instruction.

In general, in one aspect, embodiments relate to a non-transitory computer-readable storage medium having instructions configured to execute on at least one computer processor to enable the computer processor to receive a VLIW including a set of slot instructions corresponding to a set of functional units, where: each slot instruction includes an opcode identifying an operation to be performed by the set of functional units and value fields related to the operation, where a dedicated subset of the value fields include dedicated bits dedicated to the slot instruction and an allocable subset of the value fields include allocable bits allocable to other slot instructions; identify the opcodes of each slot instruction; determine, based on the opcodes, which allocable bits are allocated to which slot instructions; and instruct each functional unit to perform an operation identified by a corresponding slot instruction using the corresponding dedicated bits and any allocable bits determined to be allocated to the slot instruction.

Other embodiments will be apparent from the following description and the appended claims.

BRIEF DESCRIPTION OF THE DRAWINGS

Embodiments are illustrated by way of example, and not by way of limitation, in the figures of the accompanying drawings and in which like reference numerals refer to similar elements.

FIGS. 8A-8E show example instruction words, in accordance with one or more embodiments.

DETAILED DESCRIPTION

Figure 1:
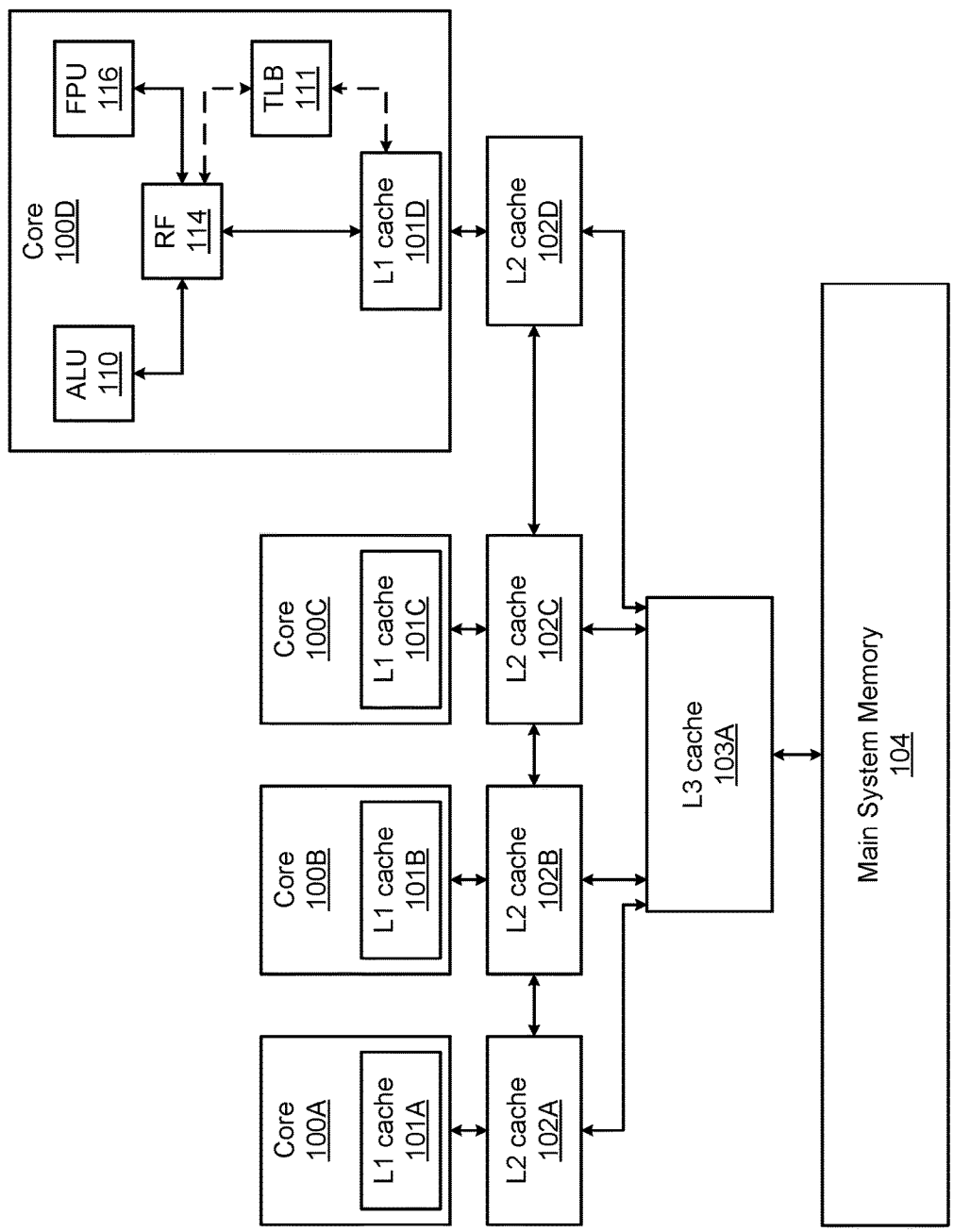
FIG. 1 shows a block diagram of a prior art computer architecture.

A portion of the disclosure of this patent document may contain material that is subject to copyright protection. The copyright owner has no objection to the facsimile reproduction by anyone of the patent document or the patent disclosure, as it may appear in the Patent and Trademark Office patent file or records, but otherwise reserves all copyrights whatsoever.

Specific embodiments will now be described in detail with reference to the accompanying figures. Like elements in the various figures are denoted by like reference numerals for consistency. In the following detailed description of embodiments, numerous specific details are set forth in order to provide a more thorough understanding of the invention. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. However, it will be apparent to one of ordinary skill in the art that the invention can be practiced without these specific details. In other instances, well-known features have not been described in detail to avoid unnecessarily complicating the description.

FIG. 1 shows a block diagram of a prior art computer architecture 199. The architecture 199 may include one or more processor cores (e.g., cores 100A-100D). Each core may include at least one L-level cache (e.g., L1 caches 101A-101D, respectively). The architecture 199 may include one or more cache levels outside the cores (e.g., L2 caches 102A-102D, L3 cache 103A, and/or other cache levels not shown). The cores 100A-100D and/or the caches may be coupled with other system memory 104 (e.g., dynamic random-access memory (DRAM)).

Each core may include various components. For example, as shown with respect to core 100D, each core may include an arithmetic logic unit (ALU) 110, a floating point unit (FPU) 116, a register file (RF) 114, a translation lookaside buffer (TLB) 111, and/or the L1 cache 101D. In one or more embodiments, some of the components may be located outside of the core (e.g., the TLB 111).

Many microprocessor chips include caches organized in a hierarchy of cache levels (e.g., L1 caches 101A-101D, L2 caches 102A-102D, L3 cache 103A, etc.). The caches are smaller, faster, and more proximate memories to the cores 100A-100D as compared to the main memory 104. The caches store copies of data from frequently used main memory 104 locations. The caches may also store some of or the same data as other caches (e.g., L2 caches 102A and 102B may store the same data). As a result, future requests for that data can be served faster. The data stored in a cache might be the result of an earlier computation, or the duplicate of data stored elsewhere.

The caches may be used by the one or more cores 100A-100D to reduce the average time to access data from the main memory 104. For example, when a core needs to read from or write to a location in the main memory 104, the core first checks whether a copy of that data is in the L1 cache. If so (often referred to as a "cache hit"), the core immediately reads from or writes to the L1 cache, which is much faster than reading from or writing to main memory 104. If not (often referred to as a "cache miss"), the core next checks whether a copy of that data is in the L2 cache, and so on. However, cache architectures may include drawbacks. For example storing the same data in multiple locations requires additional components (e.g., circuitry) in a layout and increases power consumption, thereby achieving a less efficient architecture.

Further, problems may arise with inconsistent data when multiple cores in a microprocessor chip maintain caches of a common memory resource. When one copy of an operand is changed, the other copies of the operand must also be changed. A cache coherency policy can be implemented to ensure that changes in the values of shared operands are propagated throughout the system in a timely fashion. As a result, cache coherence maintains the consistency of shared resource data that is stored in multiple local caches. For example, if the core 100A has a copy of data (e.g., from L2 cache 102A) from a previous read, and the core 100B changes the corresponding data (e.g., in L2 cache 102B), the core 100A could be left with an invalid cache of data without any notification of the change. Cache coherence is intended to manage such conflicts and maintain consistency between the caches and/or the main memory 104. Referring back to the example immediately above, a cache coherency policy could cause the memory block in the L2 cache 102A to be updated according to the change to the corresponding memory block in the L2 cache 102B to avoid conflicts. However, a cache coherency policy requires additional components in a layout, increases the amount of read and write operations, increases minimum latency, and increases power consumption.

Another drawback of cache architecture is the consequences of the use of virtual memory addressing. Virtual memory is a memory management technique that maps memory addresses used by a program, called virtual addresses, into physical addresses in memory. The operating system manages virtual address spaces and the assignment of real memory to virtual memory. Address translation hardware in a microprocessor, often referred to as a memory management units (MMU) and/or translation lookaside buffers (TLB), translates virtual addresses to physical addresses. But the use of MMUs/TLBs requires additional components in a layout (usually multiple components along a datapath), increases latency, and increases power consumption.

Figure 2:
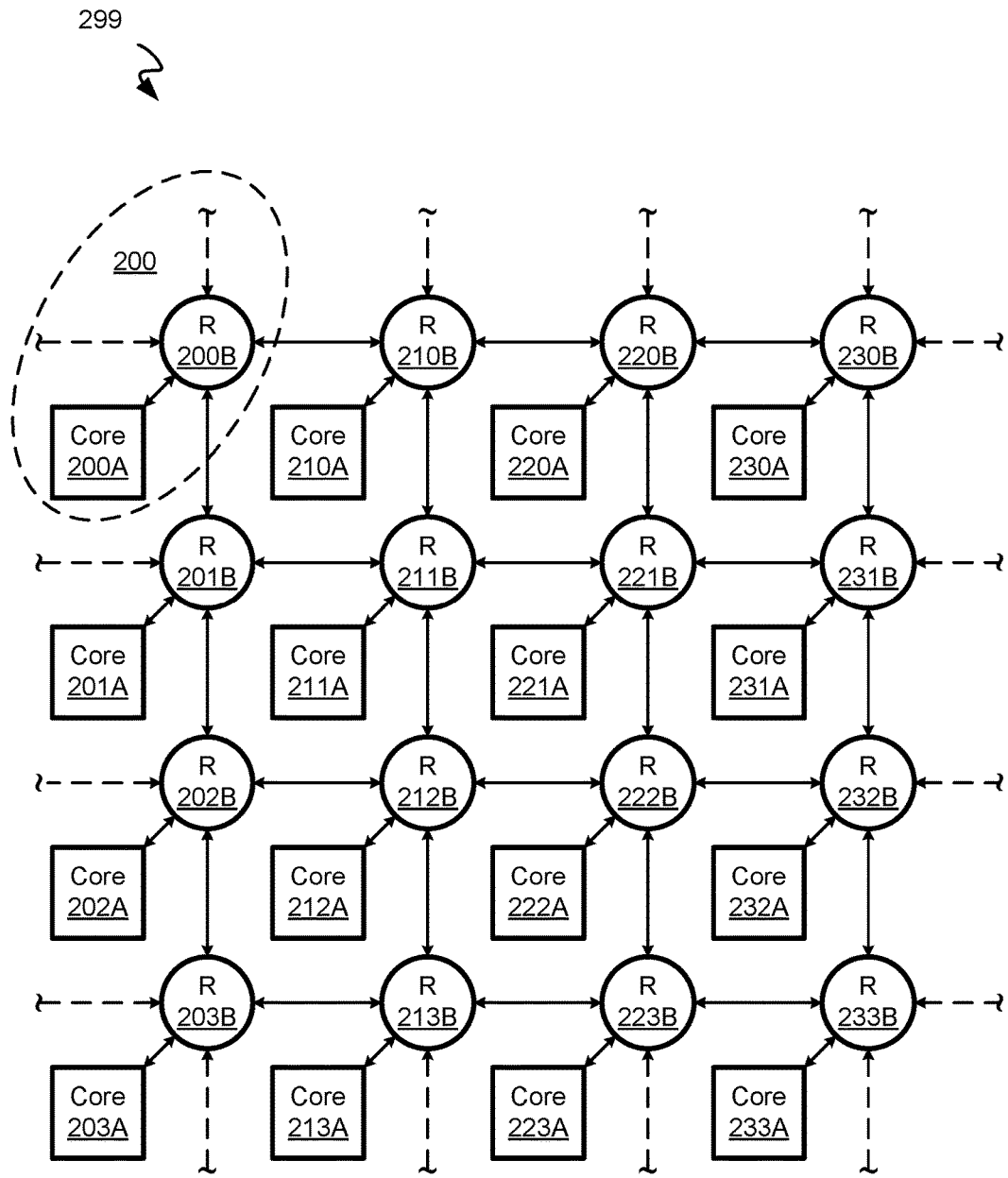
FIG. 2 shows an example multi-core processor network-on-chip architecture, in accordance with one or more embodiments.

FIG. 2 shows an example multi-core processor network-on-chip architecture 299, in accordance with one or more embodiments. In one or more embodiments, the architecture 299 includes one or more cores 200A-233A and one or more routers 200B-233B. The architecture 299 may also include or be communicatively coupled with a main system memory 204.

In one or more embodiments, a core includes functionality to carry out the instructions of a computer program by performing the basic arithmetic, logical, control, and input/output operations specified by the instructions. For example, a core may be a microprocessor that accepts data as input, processes the data according to instructions, and provides results as output. The cores 200A-233A may be the same as or similar to the core 300A of FIG. 3, discussed below. In one or more embodiments, a router includes functionality to receive one or more packets (e.g., including a data payload and destination address information) and route the one or more packets for delivery to the destination.

In one or more embodiments, each core may be communicatively coupled and associated with a respective router (e.g., through one or more data lines), forming a tile. For example, the core 200A is coupled with the router 200B (forming a tile 200), the core 201A is coupled with the router 201B (forming a tile 201, not indicated in FIG. 2), the core 210A is coupled with the router 210B (forming a tile 210, not indicated in FIG. 2), and so on (forming tiles 200-233, partially not indicated in FIG. 2).

Further, each router may be communicatively coupled with one or more routers. For example, the router 200B is coupled with at least the routers 201B and 210B. In another example, the router 211B is coupled with the routers 201B, 210B, 212B, and 221B. The routers 200B and 211B may be ultimately coupled with every other router through intermediate routers. As a result, each of the cores 200A-233A may be communicatively coupled with the other cores 200A-233A through the routers 200B-233B, thereby forming a "network" of tiles (core and router pairs). For example, the core 200A is coupled with the core 233B through the network of routers 200B-233B. In one or more embodiments, each router may be coupled with routers that are diagramically (e.g., architecturally and/or in hardware) either above, below, to the left of, and/or to the right of the router. Accordingly, the routers may be arranged in an X-Y grid.

In one or more embodiments, the architecture 299 does not include a hierarchy of cache levels (e.g., L1 cache, L2 cache, L3 cache, and so on), any cache coherency logic/components, and/or associated TLBs (translation lookaside buffer to assist in cache memory address resolving) inside or outside any core. Instead, each core may include a scratchpad memory (discussed in further detail below). It should be appreciated that in some embodiments, each core may not include a scratchpad memory but instead may be communicatively coupled with a scratchpad memory.

It should be appreciated that while FIG. 2 shows a 4 by 4 grid of 16 cores, embodiments support other arrangements and numbers of cores (e.g., an 8 by 8 grid of 64 cores, an 8 by 4 grid of 32 cores, etc.). For example, the dotted arrows in FIG. 2 illustrate that the outermost routers could be optionally coupled with additional tiles. In other words, the illustrated tiles 200-233 could be a subset of a larger tile network not shown. In other embodiments, the illustrated tiles 200-233 constitute all tiles of a microprocessor chip. In some embodiments, one or more of the outermost routers may be coupled with other electronic circuitry of a microprocessor chip.

Figure 3:
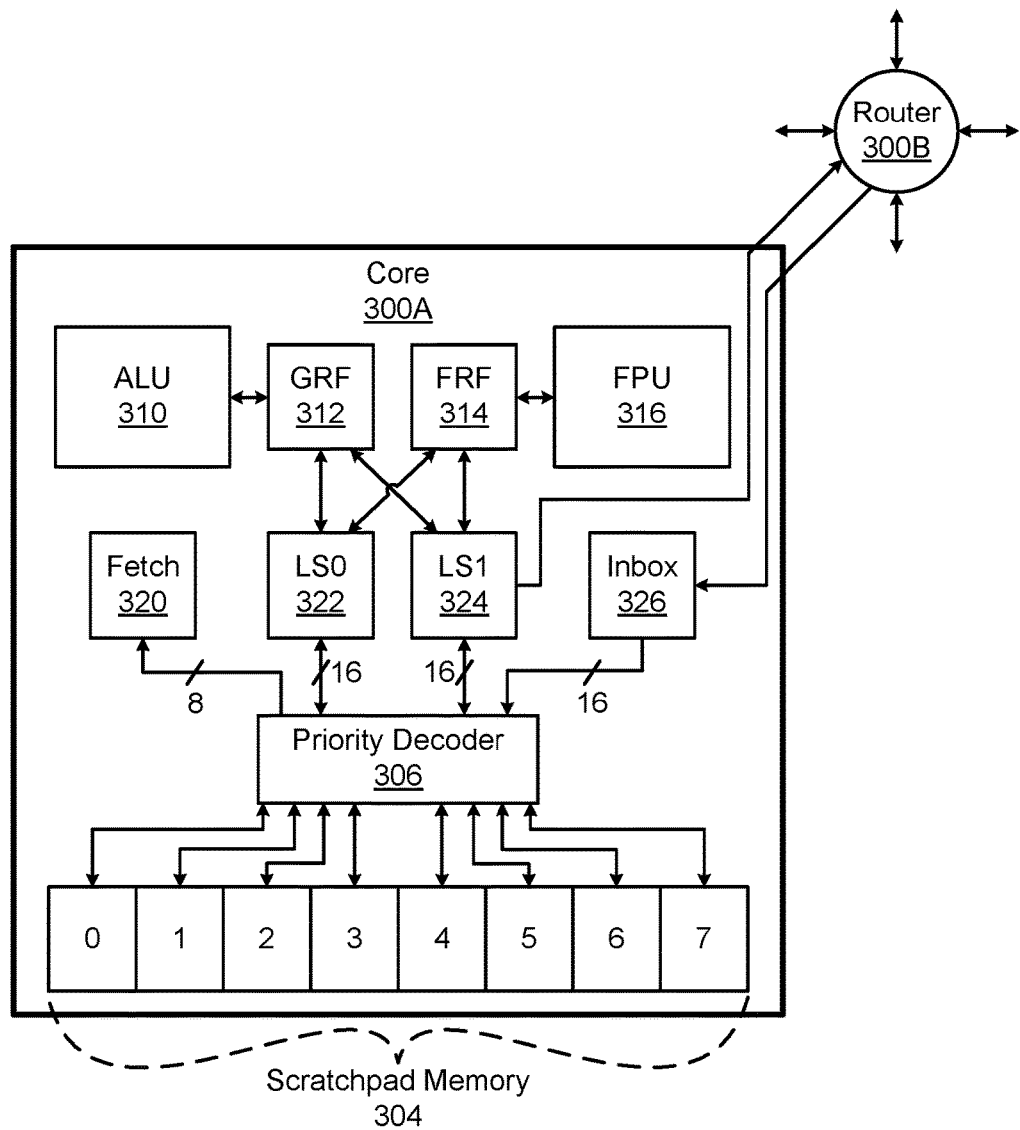
FIG. 3 shows an example processor core for use in a cache-less computer architecture, in accordance with one or more embodiments.

FIG. 3 shows an example processor core 300A for use in a cache-less computer architecture, in accordance with one or more embodiments. The core 300A may include a scratchpad memory ("scratchpad") 304, a priority decoder 306, an arithmetic logic unit (ALU) 310, a general purpose register file (GRF) 312, a floating point register file (FRF) 314, a floating point unit (FPU) 316, a fetch unit 320, a load store ("LS0") unit 322, a load store ("LS1") unit 324, and/or an inbox unit 326.

In one or more embodiments, a router 300B may be communicatively coupled and associated with the core 300A. The core 300A and the router 300B may together form a tile 300 (not indicated in FIG. 3) in a multi-core processor network-on-chip architecture. For example, the core 300A and the router 300B could be the core 200A and the router 200B of FIG. 2, respectively. In another example, the tile 300 may represent each tile 200-233 discussed with respect to FIG. 2. Accordingly, the router 300B may be communicatively coupled with routers of other tiles (not shown in FIG. 3).

The ALU 310 may include functionality to perform various operations (e.g., arithmetic and bitwise logical operations on integer binary numbers). The FPU 316 may include functionality to perform various operations on integer and/or floating point numbers (e.g., addition, subtraction, multiplication, division, square root, and bitshifting). The ALU 310 and/or the FPU 316 may include vector operation functionality. For example, the ALU 310 may include functionality to add, in parallel, individual values of a first vector with individual values of a second vector and store the resulting values as an output vector.

The GRF 312 may be communicatively coupled with the ALU 310 and include functionality to store data that is to be operated on or has already been operated on by the ALU 310. The FRF 314 may be communicatively coupled with the FPU 316, and may include functionality to store data that is to be operated on or has already been operated on by the FPU 316.

It should be appreciated that one or more embodiments may support various architectures. For example, the existence of more than one ALU 310, GRF 312, FRF 314, and/or FPU 316. In another example, no ALUs, no FPUs, and/or only one load store. It should also be appreciated that embodiments support other configurations. For example, the FPU 316 may also be communicatively coupled with the GRF 312 and operate on data stored in the GRF 312, and/or the ALU 310 may also be communicatively coupled with the FRF 314 and operate on data stored in the FRF 314. In one or more embodiments, the ALU 310 executes control flow operations.

The fetch unit 320 may be communicatively coupled with the scratchpad 304, and may include functionality to read/receive instructions from the scratchpad 304. The instructions may, for example, be used to instruct functional units of the core 300A (e.g., the ALU 310, the FPU 316, etc.) to perform specified operations on specified data.

In one or more embodiments, the LS0 322 may be communicatively coupled with the scratchpad 304, and may include functionality to receive/provide data from/to the scratchpad 304. The LS0 322 may be communicatively coupled with the GRF 312 and the FRF 314, and may include functionality to receive/provide data from/to the GRF 312 and the FRF 314. For example, the LS0 322 may load/read data from the scratchpad 304 to provide to the GRF 312 and/or the FRF 314, ultimately for operation by the ALU 310 and/or the FPU 316. In another example, the LS0 322 may receive/read data from the GRF 312 and/or the FRF 314 to store/write in the scratchpad 304.

In one or more embodiments, the LS1 324 may include at least the same functionality as the LS0 322. However, the LS1 324 (aka "outbox" 324) may be additionally communicatively coupled with the router 300B and may additionally include functionality to provide data to the router 300B (which may ultimately provide the data to components outside of the tile 300).

In one or more embodiments, the inbox 326 may be communicatively coupled with the router 300B and may include functionality to receive data from the router 300B (which may be provided from components outside of the tile 300). The inbox 326 may be also communicatively coupled with the scratchpad 304. The inbox 326 may include functionality to store data received from the router 300B and ultimately provide the data to the scratchpad 304 for storage. The inbox 326 may be or may function similarly to a single-stage memory element (discussed below).

In one or more embodiments, the scratchpad 304 is a data storage unit. For example, the scratchpad 304 may be high-speed local memory used for temporary storage of data during application execution. Advantages offered by scratchpad memory may include decreased energy usage, on-chip area savings, and/or possibly guaranteed latency. In one example, the scratchpad 304 may be formed by static random-access memory (SRAM). In one or more embodiments, the scratchpad 304 includes multiple memory modules or banks, each with a single communication port. For example, as shown in FIG. 3, the scratchpad 304 includes 8 banks, each with a single communication port. In one example, each bank includes 16 kilobytes (KB) of storage capacity, thereby constituting 128 KB of storage capacity for the scratchpad 304.

In one or more embodiments, the functional units of the core 300A have direct or indirect read and/or write access from/to the scratchpad 304. For example, the fetch unit 320, LS0 322, LS1 324, and/or inbox 326 may have substantially direct access with the scratchpad 304 (e.g., besides the intervening priority decoder 306 in some embodiments). Further, the ALU 310, GRF 312, FRF 314, and/or FPU 316 may have substantially indirect access with the scratchpad 304 (through intervening units like the LS0 322 and/or LS1 324). Further, in one or more embodiments, the functional units of the core 300A have read and/or write access from/to all banks of the scratchpad 304. For example, the LS0 322 has access to banks 0-7 of the scratchpad 304, the LS1 324 has access to banks 0-7 of the scratchpad 304, and so on.

In one or more embodiments, multiple functional units of the core 300A have concurrent read and/or write access from/to all or some banks of the scratchpad 304. For example, the LS1 324 can access banks 0 and 1, the inbox 326 can access banks 2 and 3, the fetch unit 320 can access banks 4 and 5, and the LS0 322 can access banks 6 and 7, all occurring concurrently. As a result, the architecture minimizes or eliminates memory access bottlenecks.

Figure 4:
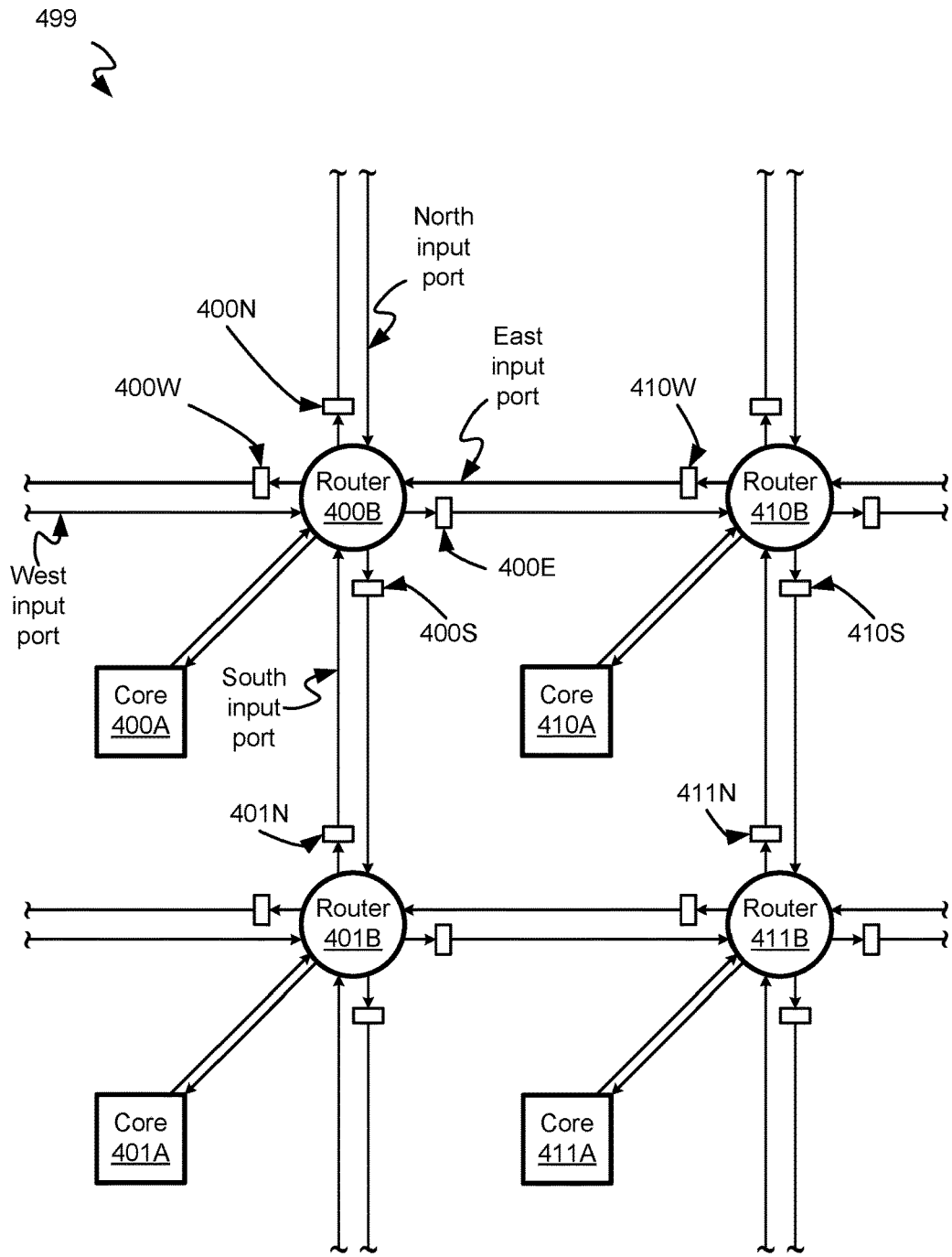
FIG. 4 shows an example multi-core processor network-on-chip architecture, in accordance with one or more embodiments.

It should be appreciated that one or more embodiments support alternative architectures of the scratchpad 304. For example, the scratchpad 304 may include multiple banks, each bank having multiple communication ports. In another example, the scratchpad 304 may include a single memory module with a single communication port (e.g., as shown in FIG. 4). In such an architecture, the memory module may be partitioned to provide multiple logical banks (e.g., 2 logical banks, 4 logical banks, 8 logical banks, and so on). In yet another example, the scratchpad 304 may include a single memory module with multiple communication ports (e.g., 8 ports). Regardless of the particular memory architecture, the functional units may still have read and/or write access from/to the entire scratchpad.

In one or more embodiments, whether the scratchpad 304 includes multiple memory banks, a single memory module logically partitioned into banks, or a single memory module, the scratchpad 304 is physically addressable (e.g., by units/components inside and/or outside the core 300A). As a result, virtual addressing is avoided and the use of TLBs can be minimized or entirely eliminated.

In one or more embodiments, if the scratchpad 304 includes multiple memory banks, each bank's physical addressing is sequential with adjacent or contiguous banks. For example, bank 1's physical addressing continues where bank 0's physical addressing ends, bank 2's physical addressing continues where bank 1's physical addressing ends, and so on. As a result, memory accesses involving data stored across more than one bank can be more simply addressed. It should be appreciated that in some embodiments, each bank's physical addressing may be sequential with adjacent or contiguous banks while not continuous. For example, there may be a gap between bank 1's and bank 0's physical addressing. In one or more embodiments, the physical addressing monotonically increases in each physical dimension (a sufficiently higher address means a higher bank number, X-axis coordinate in a grid of cores, Y-axis coordinate in a grid of cores, chip ID of network-on-chip chips, and so on).

In one or more embodiments, the priority decoder 306 may be communicatively coupled with the scratchpad 304, fetch unit 320, LS0 322, LS1 324, and/or inbox 326. The priority decoder 306 may include functionality to facilitate communication between the scratchpad 304 and other functional units of the core 300A. In some embodiments, the functional units are coupled with the priority decoder 306, which is in turn coupled with the scratchpad 304 (e.g., each bank of the scratchpad 304). Each functional unit may be coupled with the priority decoder 306 (and/or ultimately with the scratchpad 304) through multiple lines corresponding with banks of the scratchpad 304. For example, FIG. 3 shows that functional units can communicate via an 8-byte (64-bit or 64-line) bus. Other functional units can communicate via a 16-byte (128-bit or 128-line) bus. A 8-byte or 16-byte bus may include address bits, or address lines may be in addition to the 8-byte or 16-byte bus. It should be appreciated that buses are not limited to 8-byte or 16-byte buses, other buses may be implemented.

In some embodiments, the priority decoder 306 may be implemented with various multiplexers or similar components. For example, the fetch unit 320, LS0 322, LS1 324, and inbox 326 may each include a separate line coupled with a first multiplexer, where the first multiplexer is coupled with the bank 1 and selects which functional unit to couple with the bank 1. Accordingly, the functional units may each include separate lines to multiplexers, where each multiplexer is coupled with a bank and selects which functional unit to couple with that bank.

Returning to FIG. 2, in one or more embodiments, each of the cores 200A-233A includes a scratchpad memory (e.g., the same as or similar to the scratchpad 304). As a result, conventional L-level caches may not be used in the architecture 299 because the scratchpad memories of the cores 200A-233A provide data storage for each of the cores 200A-233A. For example, a scratchpad within the core 200A may provide data storage for the core 200A, a scratchpad within the core 201A may provide data storage for the core 201A, and so on. Further, the scratchpad memories of the cores 200A-233A provide data storage for other cores of the cores 200A-233A and/or the associated processor chip(s). For example, data resulting from an operation of the core 200A may be stored in the scratchpad memory of the core 211A. In another example, data needed for a future operation by the core 200A may be read from the scratchpad memory of the core 211A. In yet another example, data resulting from an operation or necessary for a future operation may be stored across the scratchpads of multiple cores. In a further example, data resulting from an operation or necessary for a future operation may be stored in the scratchpad of a core located in a different chip than that of the core executing the operation, where the cores of the different chips are part of the same core network.

In one or more embodiments, the physical addressing of each core's scratchpad is continuous with adjacent or contiguous cores' scratchpad addressing. For example, the core 201A scratchpad physical addressing continues where the core 200A scratchpad physical addressing ends, the core 202A scratchpad physical addressing continues where the core 201A scratchpad physical addressing ends, and so on. Or, for example, the core 210A scratchpad physical addressing continues where the core 200A scratchpad physical addressing ends, the core 220A scratchpad physical addressing continues where the core 210A scratchpad physical addressing ends, and so on. As a result, memory accesses involving data stored at other cores can be more simply addressed, without the use of TLBs.

Further, the functional units of the cores 200A-233A may have read and/or write access from/to the scratchpads of other cores. For example, the ALU, FPU, LS0, LS1, and/or inbox of the core 200A may have access with the scratchpad of the core 211A (e.g., through intervening components like the routers) if an instruction involves a physical address corresponding to the scratchpad of the core 211A.

FIG. 4 shows an example multi-core microprocessor network-on-chip architecture 499, in accordance with one or more embodiments. In one or more embodiments, the architecture 499 includes one or more cores 400A-411A and one or more routers 400B-411B.

In one or more embodiments, each core may be communicatively coupled and associated with a respective router (e.g., through one or more data lines), forming a tile. For example, the core 400A is coupled with the router 400B (forming a tile 400), the core 401A is coupled with the router 401B (forming a tile 401, not indicated in FIG. 4), the core 410A is coupled with the router 410B (forming tile 410, not indicated in FIG. 4), and so on (forming tiles 400-411, partially not indicated in FIG. 4).

Further, each router may be communicatively coupled with one or more routers (e.g., through an input and output port). For example, the router 400B is coupled with at least the routers 401B and 410B. In another example, the router 411B is coupled with the routers 401B and 410B. The routers 400B and 411B may be ultimately coupled with every other router through intermediate routers. As a result, each of the cores 400A-411A may be communicatively coupled with the other cores 400B-411B through the routers, thereby forming a "network" of tiles (core and router pairs). For example, the core 400A is coupled with the core 411B through the network of routers 400B-411B. In one or more embodiments, each router may be coupled with routers that are diagramically (e.g., architecturally and/or in hardware) either above, below, to the left of, and/or to the right of the router. Accordingly, the routers may be arranged in an X-Y grid.

It should be appreciated that while FIG. 4 shows a 2 by 2 grid of 4 cores, embodiments support other arrangements and numbers of cores (e.g., an 8 by 8 grid of 64 cores). For example, the outermost arrows in FIG. 4 illustrate that the outermost routers could be optionally coupled with additional tiles not shown. In other words, the illustrated tiles 400-411 could be a subset of a larger tile network not shown. For example, the tile 400 could be the same as or similar to the tile 200 of FIG. 2, the tile 401 could be the same as or similar to the tile 201 of FIG. 2, the tile 410 could be the same as or similar to the tile 210 of FIG. 2, and the tile 411 could be the same as or similar to the tile 211 of FIG. 2. In another example, the tile 400 could be the same as or similar to the tile 211 of FIG. 2, the tile 401 could be the same as or similar to the tile 212 of FIG. 2, the tile 410 could be the same as or similar to the tile 221 of FIG. 2, and the tile 411 could be the same as or similar to the tile 222 of FIG. 2.

In other embodiments, the illustrated tiles 400-411 constitute all tiles of a microprocessor chip. In some embodiments, one or more of the outermost routers in the grid may be communicatively coupled with other electronic circuitry of a microprocessor chip. Further, one or more outermost routers may not be communicatively coupled with other electronic components on their outermost side(s). For example, if the router 400B is at the west-most edge of the grid, the output port 400W and corresponding west input port may not be communicatively coupled with other components, or may not exist at all.

In one or more embodiments, single-stage memory elements may store data traveling between routers and/or cores. The memory elements may act as a single-stage buffer, holding only one stage of data (e.g., a data packet) at a time. For example, a single-stage memory element may be a D flip-flop or register. It should be noted that while the term "buffer" may be used in the present disclosure, such buffers are understood to be single-stage memory elements. In some embodiments, FIFO ("first in, first out") memory elements with two or more stages may be used.

In one or more embodiments, a single-stage memory element may be located between one or more routers (and/or between a router and its corresponding core). In some embodiments, the single-stage memory element is located on an input and/or output port of the router logic. In one or more embodiments, the router logic includes the input and/or output single-stage memory element.

For example, buffers 400N ("north"), 400W ("west"), 400S ("south"), and 400E ("east") may be located between the router 400B and other components (e.g., routers and/or cores) receiving data from the router 400B (e.g., output data lines with respect to the router 400B). For example, a buffer 400S may be located on a router 400B output data line between the router 400B and the router 401B, and a buffer 400E may be located on a router 400B output data line between the router 400B and the router 410B. The buffers 400N and 400W may be located diagramically north and west of the router 400B in cases where routers exist north and west of the router 400B (or for communication with other components of a chip). The terms "north", "west", "south", and "east" are used here to describe the diagramic location of buffers with relation to a router (e.g., buffers that are above, to the left of, below, and to the right of a router, respectively). Accordingly, the buffers may be arranged diagramically (e.g., architecturally and/or in hardware) above, to the left of, below, and to the right of a router.

Further or in another example, buffers 401N and 410W may be located between the router 400B and other components (e.g., routers and/or cores) transmitting data to the router 400B (e.g., input data lines with respect to the buffer 400B).

In one or more embodiments, routers are located within their corresponding core. For example, while the router 400B is shown to be outside of the core 400A, the components making up the router 400B may be inside, around, or partially overlapping an area of components making up the core 400A in hardware.

In one or more embodiments, buffers may be located inside of a router. For example, while the buffers 400N, 400W, 400S, and 400E are shown to be outside of the router 400B, those buffers may be located inside the router 400B in hardware. In other embodiments, buffers may be located outside of a router. For example, buffers 400N, 400W, 400S, and 400E may be located outside the router 400B and instead on a data line communicatively coupling routers.

In one or more embodiments, a core includes input and output port buffers. For example, referring to FIG. 3, the inbox 326 may be or may function similarly to an input buffer between the core 300A and the router 300B. In another example, the LS1 324 (aka outbox 324) may be or may function similarly to an output buffer between the core 300A and the router 300B.

In one or more embodiments, the buffers transfer received data after one clock cycle. For example, one or more buffers may be implemented using a D flip-flop or similar component. Each buffer may store data received at an input terminal of the buffer at a definite portion of the clock cycle (such as the rising or falling edge of the clock). The buffer may then provide the stored data at an output terminal of the buffer at the next definite portion of the clock cycle (such as the rising or falling edge of the clock). As a result, the buffers may behave as one-cycle buffers that do not store data for more than one cycle but instead pass the data during the next cycle after having received the data.

In one or more embodiments, the buffers do not pass the data on the very next cycle in cases where there is a traffic condition (discussed below). However, in such cases, the buffers may not receive and/or store additional packets, but instead may simply retain the current packet until the traffic condition is resolved (discussed below). As a result, the buffers may behave as one-stage buffers that do not store more than one stage of data. In some embodiments, the buffers may be FIFO ("first in, first out") memory elements with two or more stages.

In one or more embodiments, a core provides data to be transmitted to a location outside of the core (e.g., another core or other component of the same chip, a core or other component of another chip, or a memory location outside the core). For example, an instruction (e.g., from another core) may instruct the core 400A to store data to a memory location outside of the core 400A. As a result, the core 400A may provide a data packet (e.g., including the data and the destination address) to the router 400B.

In one or more embodiments, the routers include functionality to send the packet in a direction toward the physical, diagramic, or architectural location corresponding to the (physical) destination address (while in some embodiments, a direction advantageous for delivery to the destination address which in some cases may not be toward the diagramic/architectural/physical direction of the destination). For example, the router 400B reads the packet's destination address and determines in which direction, and thereby via which output port, to send the packet. Because the core network may use continuous physical addressing (e.g., scratchpads with continuous physical addressing across adjacent cores, chips with continuous physical addressing across adjacent chips), the routers may require less complexity and/or logic to determine in which direction to send packets as compared to virtual addressing.

For example, based on the location of the router 400B in the network and the (physical) destination address of a packet, the router 400B can determine whether the destination address is north, west, south, east, or the core 400A of the router 400B. In one example, if the location corresponding to the destination address is southeast of the router 400B, the router 400B may simply send the packet eastward (e.g., toward the router 410B) or southward (e.g., toward the router 401B). The router 400B may implement an output port selection policy to select which port to utilize first. For example, according to a core first, then east, then south, then west, then north policy, the router 400B may first send the packet eastward before sending southward, because the east direction is of higher priority. It should be appreciated that embodiments support other output port selection policies.

The next routers that receive the packet may perform the same process until the packet reaches the destination. For example, if the router 410B receives a packet from the router 400B, the router 410B may read the packet's destination address and determine in which direction to send the packet according to the physical addressing. For example, southward toward the router 411B if the physical address corresponds to a location southward, eastward toward an easterly router (not shown) if the physical address corresponds to a location eastward, or eastward toward an easterly router (not shown) if the physical address corresponds to a location southeastward (if implementing the output port selection policy discussed above). If the packet's destination address corresponds to the associated core 410A and/or an internal core memory address (e.g., the core 410A's scratchpad memory), the router 410B will send the packet to the core 410A.

In one or more embodiments, the routers include functionality to implement a deterministic routing policy, such as a static priority routing policy. The static priority routing policy may assign static priority to designated input ports of a router. For example, the router 400B may receive two or more packets (e.g., from other routers or the core 400A) to be sent through the same output port of the router 400B (i.e., in the same direction or through the same output port). If the two or more packets are ready to be sent through the same output port, a conflict arises because the ("conflicted" or "flooded") output port may only be able to send the packet of one input port at a time. In one or more embodiments, the input ports receive the two or more packets on the same clock cycle (e.g., simultaneously).

In this case, the router may implement a static priority routing policy where input ports are assigned priority levels that do not change (e.g., because they are represented by hardware logic), and therefore the priority assignment is static. For example, the highest priority may be assigned to the north input port, then west input port, then south input port (i.e., the port corresponding to the buffer 401N), then east input port (i.e., the port corresponding to the buffer 410W), then the core's 400A input port. As a result, the router 400B may first send packets from the north input port through the conflicted output port until there are no more packets from the north input port, then from the west input port until there are no more packets from the west input port and while there are no new packets from the north input port, and so on.

Accordingly, the packets received at input ports with less priority may remain at those input ports (e.g., at the corresponding input port buffer) until there are no more packets from input ports with higher priority to be sent on through the conflicted output port. For example, consider the case where there is a first packet from the north input port of the router 400B that is to be routed southward toward the router 401B, and at the same time there is a second packet from the east input port of the router 400B (i.e., the port corresponding to the buffer 410W, from the router 410B) that is also to be routed southward toward the router 401B. The router 400B may give priority to the first packet from the north input port to be sent southward first. Meanwhile, the second packet from the east input port would remain stalled at the buffer 410W. If the north input port of the router 400B (or any other input port of the router 400B with higher priority than the east input port) continue(s) to provide packets to be routed southward, the second packet from the east input port will remain stalled at the buffer 410W until all packets from higher priority input ports have been routed along.

Continuing the example, other packets that are to be sent on stalled lines will also be stalled until the stalled lines are no longer stalled. Consider the case where there is also a third packet from the router 411B that is to be routed to the router 410B, and then from the router 410B to the router 400B. If the second packet is stalled at the buffer 410W, then the third packet will be stalled at a buffer 411N until the second packet can continue passed the buffer 410W. If there are other packets that are to travel from the router 410B to the router 400B, and/or other packets that are to travel from the router 411B to the router 410B, those packets will also be stalled until the stalled lines are no longer stalled. As a result, "back pressure" formed by stalled packets may form until the lines in their travel path are no longer stalled.

In one or more embodiments, the input port priority for a router never changes, and for that reason is static. In other words, if the priority is in the order of north, then west, then south, then east, and then core, the north input port will always have priority over all other input ports, the west input port will always have priority over all remaining input ports, and so on. Such a routing policy is deterministic because for every state (of combinations of data packets at different ports of routers), the following state may be determined. In one or more embodiments, all routers of a core network implement the same static input port priority protocol.

In one or more embodiments, a buffer does not exist between a core and its corresponding router. As a result, if a packet sent by the core is stalled at the router in favor of an input port with higher priority, the execution at the core may be stalled indefinitely until the packet is sent on.

In addition, a core may handle an incoming packet from the router when the packet arrives (stalling execution in the core if a hazard would occur). Data packet traffic of the routers may have priority over core traffic. For example, if a data packet sent from a core's router to that core is to be written to the scratchpad memory of the core, that write operation will supersede all other core operations. Accordingly, in one or more embodiments, the overall execution of the cores in a network, and data packet traffic, will not be stalled due to traffic caused by cores that are busy executing other operations instead of accepting incoming data packets. In other words, some sort of progress may be made every clock cycle until no in-transit packets remain.

In one or more embodiments, the routers may be operable to communicate with neighboring routers to indicate whether the routers' input ports are stalled. For example, if a router indicates that a particular input port is stalled, the neighboring router will retain a packet that is to be transmitted to that input port. If a router indicates that a particular input port is not stalled, the neighboring router will transmit the packet to that input port.

The static priority routing policy can be described from the perspective of the router output ports. For example, consider the priority schedule discussed above (i.e., north, west, south, east, core). For each cycle, the router (or a particular output port) may determine if there is a packet at the highest priority input port (i.e., the north input port) that is to be transmitted through the particular output port. If so, then the particular output port will transmit that packet. If not, the router may determine if there is a packet at the next highest priority input port (i.e., the west input port) that is to be transmitted through the particular output port. If so, then the particular output port will transmit that packet. If not, the router will continue the process until a packet that is to be transmitted through the particular output port is found or all input ports have been checked. The router may perform this process for each output (or, each output port may perform this process).

In one or more embodiments, the router (or the particular output port) may not check the input port associated with an output port for a packet to be transmitted through the particular output port, thereby omitting a step that may not be necessary in some embodiments. For example, for a west output port, the router may not check the west input port for a packet to be transmitted through the west output port because a packet traveling eastward would not travel westward. In other words, a packet will not travel in a reverse direction.

A static priority routing policy may require hardware design that is simpler than other designs and does not require retaining a state of some number of cycles of history. In addition, a static priority routing policy may be simpler to describe in software using bitmasks. Further, a static priority routing policy may be statically decidable at compile time, a consequence of which is that within a compile unit, a network of cores can be guaranteed to be deadlock-free so long as all send sequences halt (e.g., an off-core store instruction). If a compiler optimizes for all cores in a network, guarantees can be made on packet traffic within that network. And, for any given model of parallelism, a compiler may explicitly describe the priority of a concurrent thread's network access by its location within the network.

It should be appreciated that a static priority routing policy is not limited to the priority schedule discussed above (i.e., north, west, south, east, core). For example, a static priority routing policy could implement one of the following priority schedules:

north, east, south, west, core;
    west, south, east, north, core;
    north, south, west, east, core;
    core, north, west, south, east; or
    any other permutation of input port priority schedules.

In one or more embodiments, when there are no stalled lines in the travel path of a packet, the architecture 499 can guarantee that the packet will travel between two routers in one cycle. For example, a packet sent from the router 400B (e.g., from the buffer 400E) can reach the router 410B in one cycle. In one or more embodiments, when there are no stalled lines in the travel path of a packet, the architecture 499 can guarantee that the packet will travel from a first core to an adjacent core in two cycles. For example, a packet sent from the core 400A to the core 410A can reach the router 410B in a first cycle. This may be because a load store unit of the core 400A (e.g., the LS1 324 of FIG. 3) may be or may function similarly to an output buffer between the core 400A and the router 400B (e.g., the buffer 400E), similar to the buffers 400N, 400W, or 400S. The packet can then reach the core 410A (e.g., the inbox 326 of FIG. 3) in a second cycle.

Figure 5:
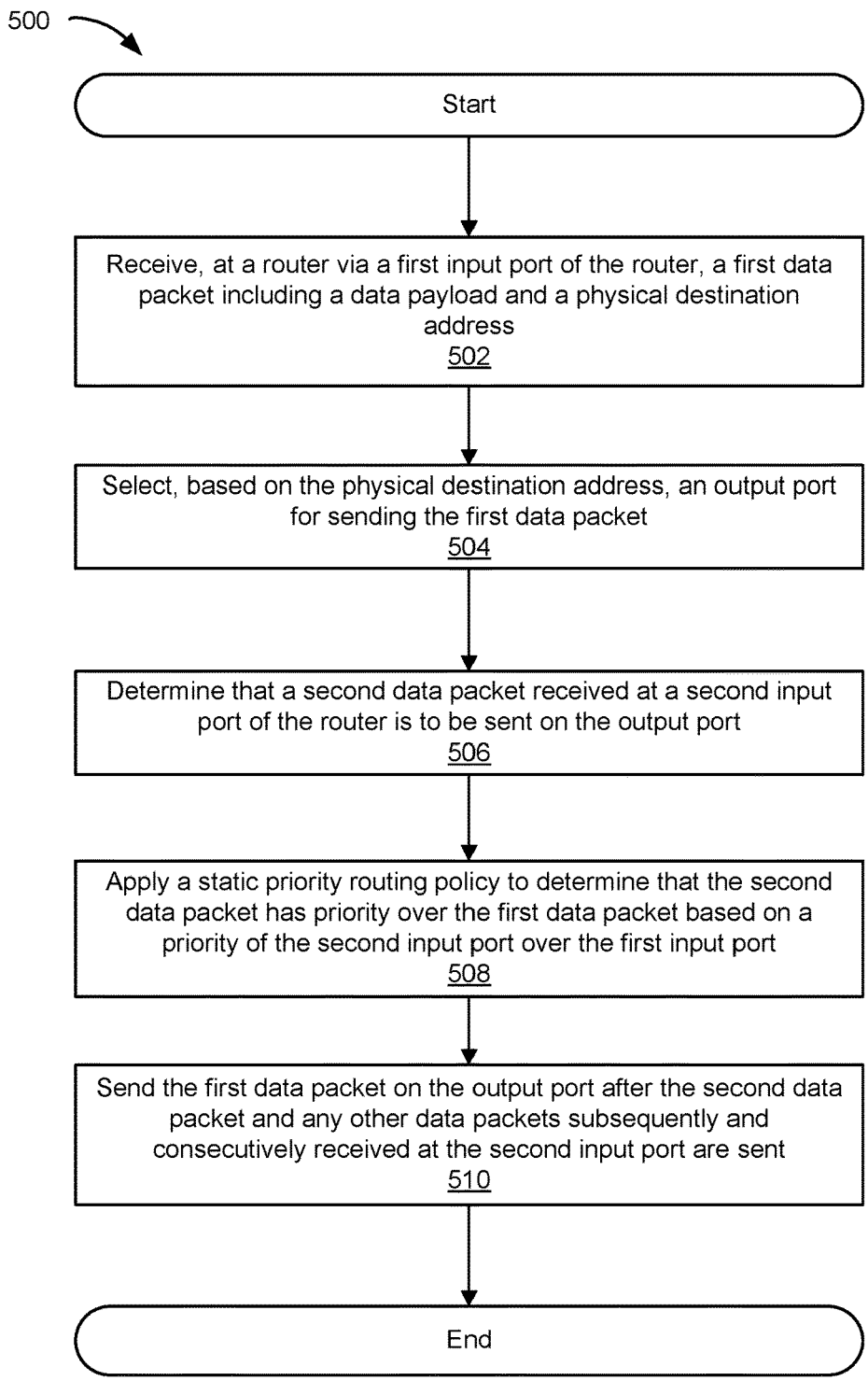
FIG. 5 shows a flowchart in accordance with one or more embodiments.

FIG. 5 shows a flowchart of a method for routing data packets according to a static priority routing policy (e.g., in a network-on-chip architecture). While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 5 should not be construed as limiting the scope of the invention.

In STEP 502, a first data packet including a data payload and a physical destination address is received at a router via a first input port of the router. For example, with reference to FIG. 4, a first data packet may be received at the west input port of the router 400B. The first data packet may include a data payload (e.g., information, data, instructions, etc.) and a physical destination address (e.g., a destination memory location, a destination router, a destination core, etc.).

In STEP 504, an output port for sending the first data packet based on the physical destination address is selected. Continuing the example, it may be determined that the first data packet is to be sent on via the south output port of the router 400B (through the buffer 400S) to the router 401B (e.g., if the physical destination address is south of the router 400B).

In STEP 506, a second data packet received at a second input port of the router is determined to be sent on the output port. Continuing the example, a second data packet may be received at the north input port of the router 400B (e.g., at the same time and/or on the same clock cycle as the receipt of the first data packet). Based on the physical destination address of the second data packet, it may be determined that the second data packet is also to be sent on via the south output port of the router 400B to the router 401B (e.g., if the physical destination address is south of the router 400B).

In STEP 508, a static priority routing policy to determine that the second data packet has priority over the first data packet based on a priority of the second input port over the first input port is applied. Continuing the example, a north, west, south, east, core static priority routing policy may be applied to determine that the second data packet from the north input port has priority over the first data packet from the west input port.

In STEP 510, the first data packet is sent on the output port after the second data packet and any other data packets subsequently and consecutively received at the second input port are sent. Continuing the example, the second data packet may be sent on via the south output port of the router 400B before the first data packet is sent on via the south output port of the router 400B. Further, if there were subsequent and consecutive data packets arriving at the north input port of the router 400B, those data packets may be first sent on via the south output port of the router 400B before the first data packet is sent on.

Figure 6:
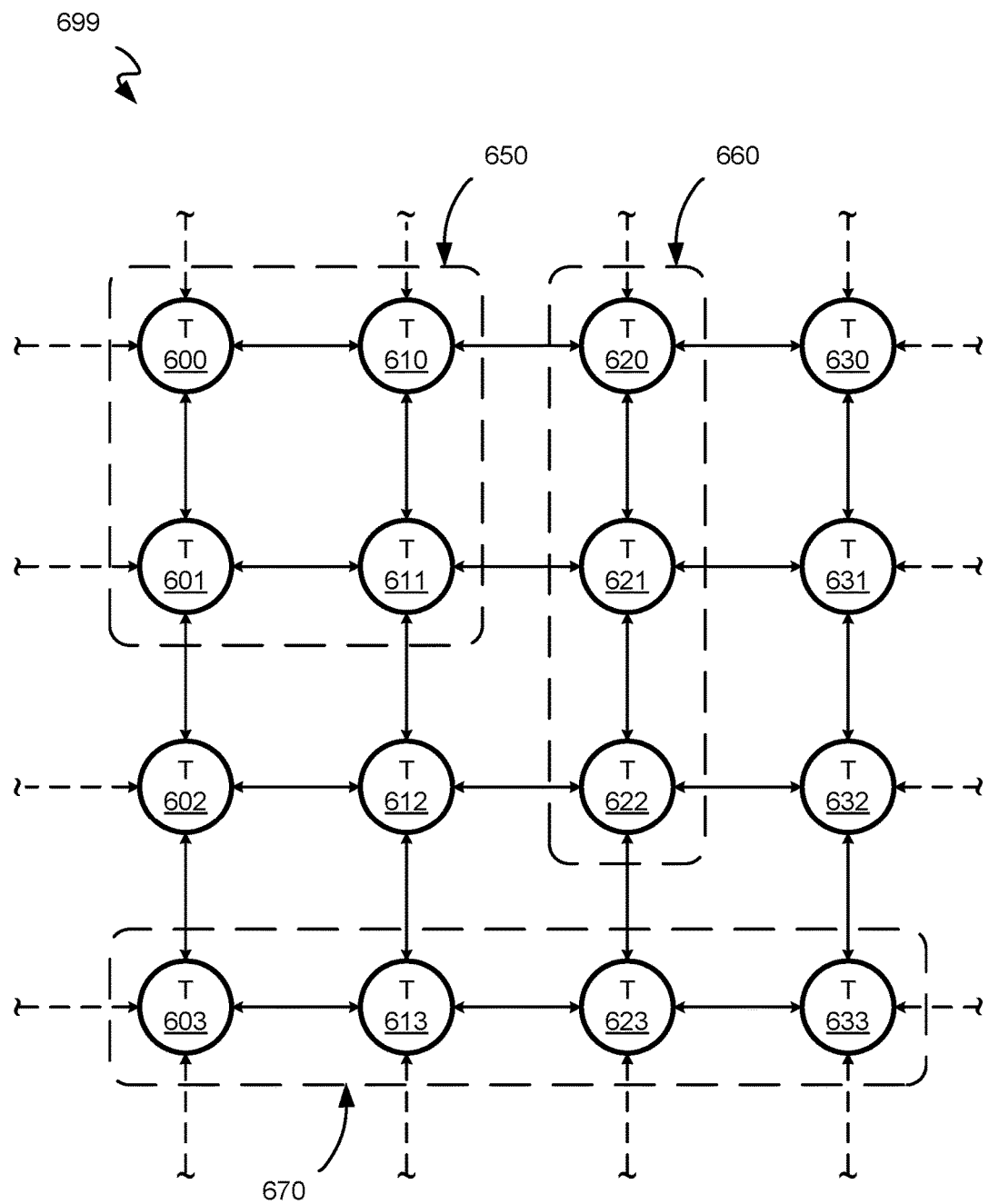
FIG. 6 shows example tiles of a multi-core processor network-on-chip architecture, in accordance with one or more embodiments.

FIG. 6 shows example tiles of a multi-core processor network-on-chip architecture 699, in accordance with one or more embodiments. In one or more embodiments, the architecture 699 includes one or more tiles 600-633. The tiles 600-633 may be the same as or similar to the tiles 200-233 of FIG. 2. For example, the tile 600 may be the same as the tile 200, the tile 601 may be the same as the tile 201, the tile 610 may be the same as the tile 210, and so on. Accordingly, each tile may include a core and router pair and be communicatively coupled with adjacent tiles (e.g., that are diagramically/architecturally/physically either above, below, to the left of, and/or to the right of the tile) in a grid configuration, thereby forming a "network" of tiles. In another example, at least some of the tiles 600-633 may be the same as or similar to the tiles of FIG. 4. For example, the tile 600 could be the same as or similar to the tile 400 (i.e., including core 400A and router 400B), the tile 601 could be the same as or similar to the tile 401 (i.e., including core 401A and router 401B), the tile 610 could be the same as or similar to the tile 410 (i.e., including core 410A and router 410B), and the tile 611 could be the same as or similar to the tile 411 (i.e., including core 411A and router 411B).

In one or more embodiments, an optimization module includes functionality to assign processes (or functions) of an application to be executed by a multi-core processor to tiles of the multi-core processor so as to optimize execution of the application in accordance with the static priority routing policy. For example, a user application may be received (e.g., in the form of source code, assembly code, or machine) with identification of one or more high priority functions. The high priority functions may be assigned to one or more particular tiles to take advantage of determinism guaranteed by aspects of the architecture discussed herein. For example, a static priority routing policy may cause network-on-chip traffic patterns or execution that are substantially or fully deterministic. The deterministic property can be relied upon at compile time to assigned processes to tiles. It should be appreciated that in some embodiments, optimizing execution of the application may not achieve mathematically optimal execution, but otherwise improve or substantially optimize the execution.

Determinism can be guaranteed on a system where the network-on-chip behavior (including packet latency, transmission order, and direction) can be known prior to execution, generally at compile time. Determinism can be guaranteed for at least a region of the network-on-chip (e.g., a set of adjacent tiles). However, determinism may not be guaranteed if, for example, a burst of packets arrive from another chip or "rogue" packets arrive from cores outside of the region. Nevertheless, even in such cases determinism can be substantially or fully guaranteed when further information is known or assumed about the system (e.g., knowing where the store instruction trying to use the network-on-chip is loaded (the source tile) and the address it is trying to store to (the destination tile)).

It should be understood that identification of a high priority function may not necessarily be received, but instead identification thereof determined through analysis and/or simulation of the user application. In one or more embodiments, a high priority function may be one that is essential to the execution of the application, for which responsive/fast execution of is required/preferred, that causes a high amount of outgoing data packets, and/or any other factor making the execution thereof important with respect to other functions.

For example, referring to FIG. 6, consider the case where the tiles 600-633 implement a north, west, south, east, core static priority routing policy (i.e., where the north input ports are assigned the highest priority, then the west input ports, and so on). Accordingly, data packets sent by tiles that are more northward will have higher priority over data packets sent by tiles that are more southward. For example, data packets from the tile 600 sent to the tile 601 will have priority over data packets from the tile 611 sent to the tile 601 (because data packets from the tile 600 will be received at the north input port of the tile 601, which has higher priority than data packets received at the east input port of the tile 601). For this reason, the more north a tile is located in the grid, the more priority outgoing data packets of the tile will receive.

Further, data packets sent by tiles that are more westward will have higher priority over data packets sent by tiles that are more eastward. For example, data packets from the tile 600 sent to the tile 610 will have priority over data packets from the tile 611 sent to the tile 610 (because data packets from the tile 600 will be received at the west input port of the tile 610, which has higher priority than data packets received at the south input port of the tile 610). For this reason, the more west a tile is located in the grid, the more priority outgoing data packets of the tile will receive.

For these reasons, the more northwest a tile is located in the grid, the more priority outgoing data packets of the tile will receive (e.g., outgoing data packets of the tile 600 are provided the highest priority as they travel south and/or west). Consequently, the more southeast a tile is located in the grid, the more priority outgoing data packets of the tile will receive (e.g., outgoing data packets of the tile 600 are provided the highest priority as they travel north and/or east).

Accordingly, a function that is of high priority may be assigned to one or more tiles located in an area of the grid with higher routing priority (e.g., more north and/or west in the example above) so as to optimize execution of the application and/or high priority function in accordance with the static priority routing policy. For example, a function that produces a high amount of outgoing data packets may be assigned to the tile 600, the tile 610, or a group of tiles 650 (which include the tiles 600, 601, 610, and 611), which may provide optimal outgoing data packet priority. Consequently, low priority functions or functions with a low amount of outgoing packets may be assigned to tiles located in an area of the grid with lower routing priority (e.g., more south and/or east in the example above). For example, a function that produces a low amount of outgoing data packets may be assigned to the tile 633, the tile 613, or a group of tiles 670 (which include the tiles 603, 613, 623, and 633).

In another example, a function may be of high priority in terms of receiving packets (e.g., it is important that the function receive data quickly). Such a function may be assigned to one or more tiles located in an area of the grid with "lower" routing priority (e.g., more south and/or east in the example above) so as to optimize execution of the application and/or high priority function in accordance with the static priority routing policy. Even though the function is assigned to a "lower" routing priority area, packets may be routed to the function more quickly. In another example, a function may be of high priority in terms of providing packets to or receiving packets from a peripheral external to the grid. Such a function may be assigned to one or more tiles located in an area of the grid more proximate to an input/output block associated with the peripheral.

In one or more embodiments, one or more functions may be assigned to groups of tiles so as to optimize execution of the application and/or the functions in accordance with the static priority routing policy. For example, consider the case where two functions frequently, consistently, or often communicate with one another (unilaterally or bilaterally). To optimize execution, two functions may be assigned to groups of tiles that are proximate. For example, the two functions may be assigned to the group of tiles 650 and a group of tiles 660 (which include the tiles 620-622).

Further, the two functions may be assigned to groups of tiles based on which function sends more data packets to the other and/or which function is of higher priority. For example, the function that sends more packets (and/or of higher priority) may be assigned to the group of tiles 650 and the function that receives more packets (and/or of lower priority) may be assigned to the group of tiles 660. Accordingly, packets sent from the group of tiles 650 toward the group of tiles 660 will have higher priority than packets sent from the group of tiles 660 toward the group of tiles 650.

In one or more embodiments, a function may be assigned to a group of tiles with a particular configuration or arrangement so as to optimize execution of the application and/or the function in accordance with the static priority routing policy. For example, a function may execute optimally when executed by a group of tiles in a square configuration (e.g., like the group of tiles 650). In another example, a function may execute optimally when executed by a group of tiles in a linear configuration (e.g., like the group of tiles 660 or 670).

In one or more embodiments, the optimization module includes functionality to determine optimal assignment configurations of functions to tiles of the multi-core microprocessor chip. For example, execution of different configurations of a set of functions may be simulated on a multi-core microprocessor chip (or a software model thereof).

The multi-core microprocessor chip may include a set of tiles arranged in a grid configuration (e.g., much like FIGS. 2, 4, and 6). The different configurations may include execution of the set of functions by different groups of tiles. For example, execution of a particular function may be simulated when assigned to the group of tiles 650 and again when assigned to the group of tiles 670.

Further, different combinations of other functions may be simulated with the simulations of the particular function. For example, while the particular function may be simulated when assigned to the group of tiles 650, a second function may be simulated when assigned to the group of tiles 660, then again when the second function may be simulated when assigned to the group of tiles 630-632, and so on. Then while the particular function may be simulated when assigned to the group of tiles 670, the second function may be again simulated while assigned to different groups of tiles, and so on. In this way, different combinations of configurations may be simulated. It should be appreciated that traffic patterns of particular functions may be known from previous simulations. Accordingly, simulation of those particular functions may not be necessary.

The network traffic patterns of the execution of the different configurations may be monitored and ranked according to ranking criteria. The ranking criteria are used to rank each of the different configurations based on the network traffic patterns corresponding to each configuration. An optimal configuration of the different configurations may be selected based on the ranking.

Figure 7A:
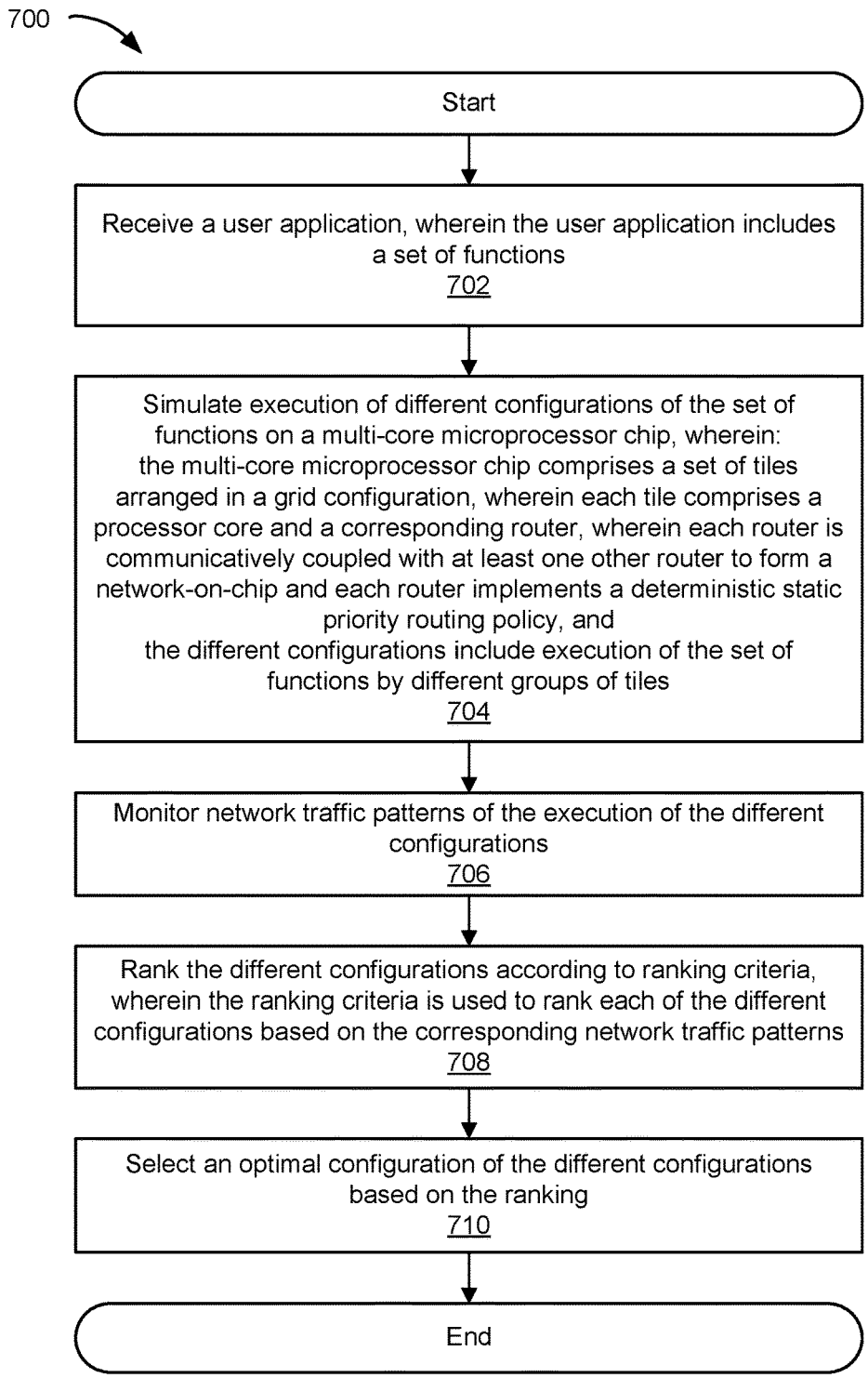
FIGS. 7A and 7B show flowcharts in accordance with one or more embodiments.

FIG. 7A shows a flowchart of a method for assigning functions of an application to processor tiles so as to optimize execution of the application in accordance with a static priority routing policy (e.g., in a multi-core processor). While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 7A should not be construed as limiting the scope of the invention.

In STEP 702, a user application is received, where the user application includes a set of functions. For example, the user application may be directed to an automobile control system including driverless car functions, climate control functions, media entertainment functions, etc.

In STEP 704, execution of different configurations of the set of functions is simulated on a multi-core microprocessor chip (e.g., the multi-core processor network-on-chip architecture 699 of FIG. 6), where the multi-core microprocessor chip includes a set of tiles arranged in a grid configuration (e.g., the tiles 600-633), where each tile includes a processor core and a corresponding router, where each router is communicatively coupled with at least one other router to form a network-on-chip and each router implements a deterministic static priority routing policy. And the different configurations include execution of the set of functions by different groups of tiles.

Continuing the example, the functions of the automobile control system may be executed by different configurations of the tiles 600-633. For example, a first configuration may include execution of the driverless car functions by the group of tiles 650, the climate control functions by the group of tiles 660, and the media entertainment functions by the group of tiles 670. A second configuration may include execution of the driverless car functions by the group of tiles 660, the climate control functions by the group of tiles 670, and the media entertainment functions by the group of tiles 650. A third configuration may include execution of the driverless car functions by the group of tiles 670, the climate control functions by the group of tiles 650, and the media entertainment functions by the group of tiles 660.

In STEP 706, network traffic patterns of the execution of the different configurations are monitored. Continuing the example, the network traffic patterns of each configuration of the automobile control system through the network-on-chip architecture 699 may be monitored.

In STEP 708, the different configurations are ranked according to ranking criteria, where the ranking criteria is used to rank each of the different configurations based on the corresponding network traffic patterns. Continuing the example, the first, second, and third configurations may be ranked based on the traffic patterns of each configuration implemented on the network-on-chip architecture 699.

In STEP 710, an optimal configuration of the different configurations is selected based on the ranking. Continuing the example, the optimal configuration of the first, second, and third configurations is selected for implementation.

Figure 7B:
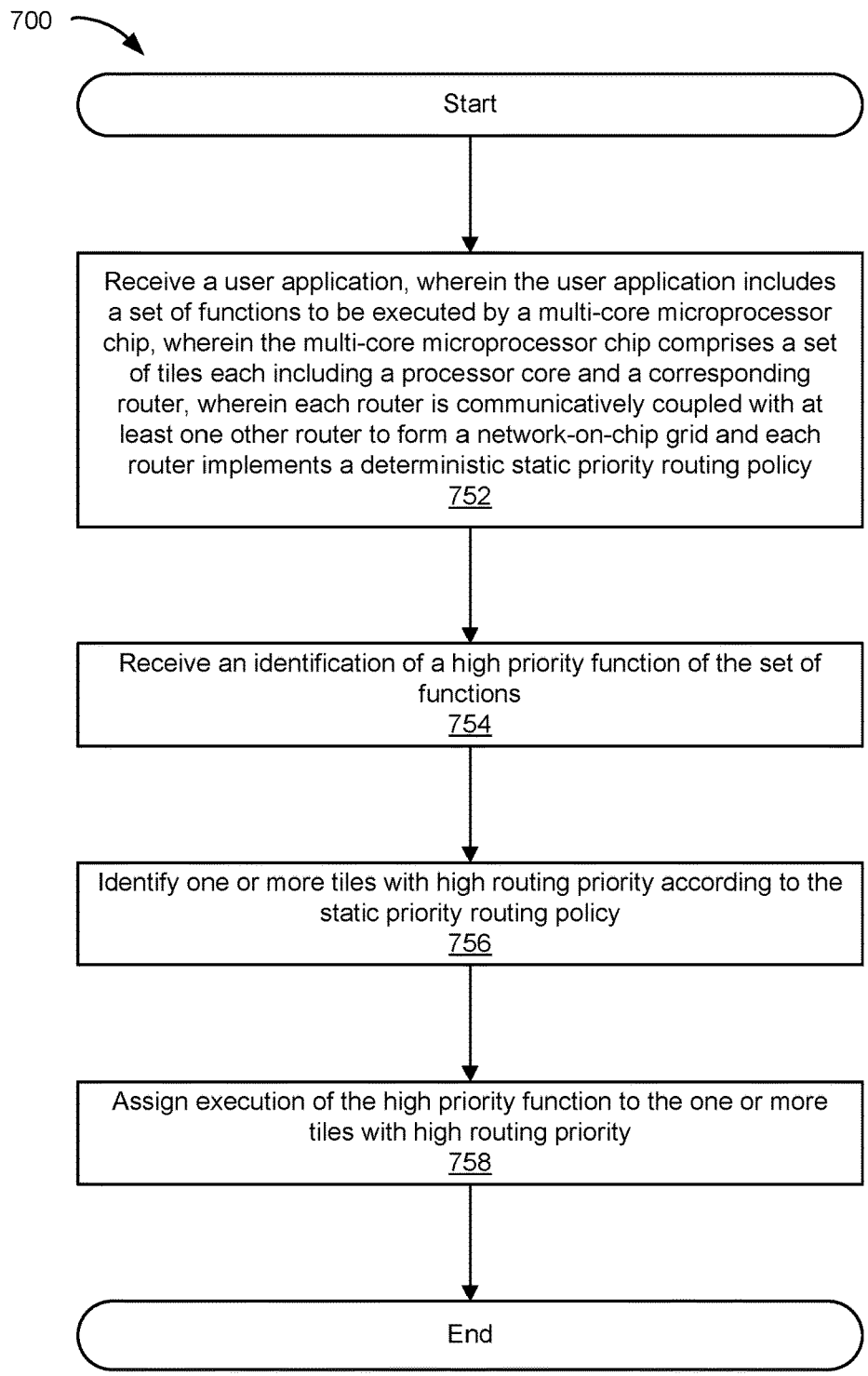

FIG. 7B shows a flowchart of a method for assigning functions of an application to processor tiles so as to optimize execution of the application in accordance with a static priority routing policy (e.g., in a multi-core processor). While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 7B should not be construed as limiting the scope of the invention.

In STEP 752, a user application is received. For example, the user application may be directed to an automobile control system including driverless car functions, climate control functions, media entertainment functions, etc. The user application may include a set of functions (e.g., the automobile control system's functions) to be executed by a multi-core microprocessor chip (e.g., the multi-core processor network-on-chip architecture 699 of FIG. 6), where the multi-core microprocessor chip includes a set of tiles each including a processor core and a corresponding router (e.g., the tiles 600-633), where each router is communicatively coupled with at least one other router to form a network-on-chip grid and each router implements a deterministic static priority routing policy.

In STEP 754, an identification of a high priority function of the set of functions is received. Continuing the example, the user application (or another source) may indicate that the driverless car functions are high priority functions. Degrees of priority may be identified, e.g., that the driverless car function(s) are of higher priority than the media entertainment function(s), which are in turn of higher priority than the climate control function(s). In some embodiments, sub-function levels of priority may be identified (e.g., a subset of sub-functions of the driverless car functions are of higher priority than another subset of sub-functions of the driverless car functions and/or a subset of sub-functions of the media entertainment functions).

In STEP 756, one or more tiles with high routing priority are identified according to the static priority routing policy. Continuing the example, if a north, then west, then south, then east, and then core static priority routing policy is implemented, more northwesterly tiles may be identified as having high routing priority compared to more southeasterly tiles, for example.

In STEP 758, execution of the high priority function is assigned to the one or more tiles with high routing priority.

Continuing the example, the high priority driverless car functions may be assigned to more northwesterly tiles (or any other tiles for which facilitate optimized execution of the driverless car functions).

FIGS. 8A-8E show example instruction words, in accordance with one or more embodiments. The instruction words may be described as Very Long Instruction Words (VLIW). VLIWs allow a processor architecture to take advantage of instruction level parallelism (ILP). Conventional processor architectures allow programs to specify instructions that will be executed in sequence. However, a VLIW architecture allows programs to explicitly specify instructions that will be executed in parallel. As a result, VLIW architecture allows higher performance without the inherent complexity of some other approaches.

In one or more embodiments, a processor core (e.g., the core 300A) or a component thereof (e.g., the fetch unit 320) may receive or access a VLIW. The VLIW may be used to instruct components of the processor core (e.g., components of the core 300A) to perform operations in accordance with particular operands.

Figures 8A, 8B:
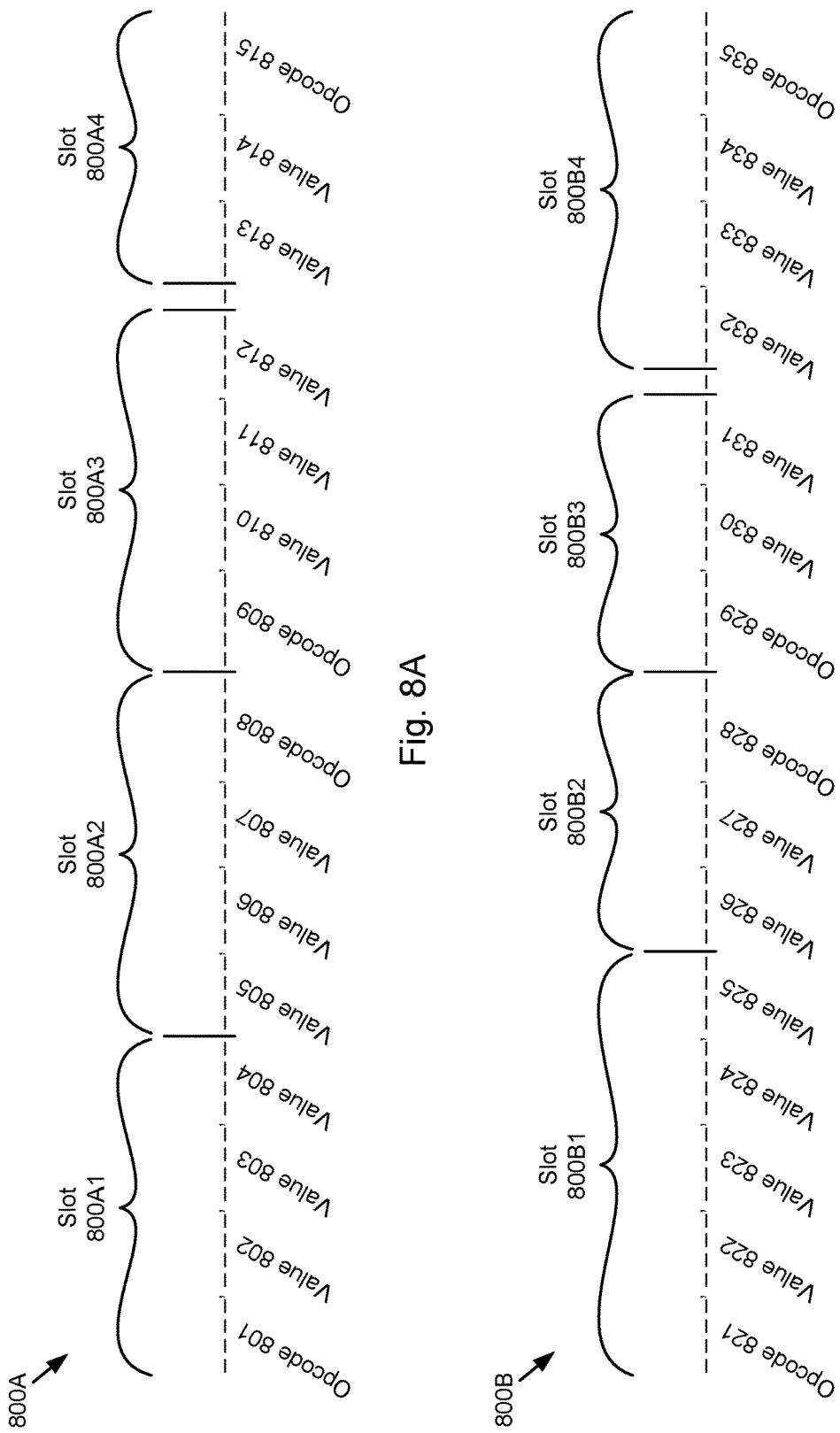

Referring to FIG. 8A, a VLIW 800A is shown. The VLIW 800A includes 64 bits, but it should be appreciated that embodiments support other bit lengths (e.g., 32 bits, 80 bits, 128 bits, etc.). The bits of the VLIW 800A may be logically grouped into different instruction "slots", for example, the slots 800A1-800A4. Each slot may represent an instruction to a functional unit of a processor, or "slot instruction" (e.g., to the functional units of the processor core 300A of FIG. 3). For example, the slots 800A1-800A4 may include instructions for the FPU 316, LS0 322, LS1 324, and the ALU 310, respectively.

Each slot instruction may include one or more fields. For example, the slot 800A1 may include an opcode field 801 and value fields 802-804, the slot 800A2 may include value fields 805-807 and an opcode field 808, the slot 800A3 may include an opcode field 809 and value fields 810-812, and the slot 800A4 may include value fields 813-814 and an opcode field 815. An opcode field may indicate a particular operation to be executed involving the value fields of the same instruction. For example, the opcode 801 may indicate an operation to be executed involving registers designated by the value fields 802-804. A value field may indicate which register contains an operand related to the operation (e.g., via a memory address value), to which register to store a resulting value of the operation (e.g., via a memory address value), or other values related to the operation (e.g., address offsets, immediate values, flags, etc.).

In one or more embodiments, different instructions in a VLIW may include a different number of fields for a particular functional unit. For example, the VLIW 800A may represent the number of fields for a particular set of slot instructions. More specifically, the slot 800A1 may include four fields, the slot 800A2 may include four fields, the slot 800A3 may include four fields, and the slot 800A4 may include three fields. Meanwhile, referring to a VLIW 800B shown by FIG. 8B, a slot 800B1 may include five fields (not four fields), a slot 800B2 may include three fields (not four fields), a slot 800B3 may include three fields (not four fields), and a slot 800B4 may include four fields (not three fields), where the slots 800B1-4 may correspond to the same functional units as the slots 800A1-4, respectively.

For example, while the slot instruction represented by the slot 800A1 may require an opcode and only three value fields, the slot instruction represented by the corresponding slot 800B1 may require an opcode and four value fields. In order to accommodate the instruction length of the slot instruction of the slot 800B1, the length of the slot 800B1 may increase beyond the length of the corresponding slot 800A1. As a result, the slot 800B1 may extend into an area of allocable bits that are part of the slot 800A2 in FIG. 8A. As a result, the length of the slot 800B2 may be decreased as compared to the length of the corresponding slot 800A2, because allocable bits that represented a slot instruction of the slot 800A2 in one VLIW configuration are allocated to a slot instruction of the slot 800B1 in another VLIW configuration.

However, the slot instruction of the slot 800B2 may require an opcode field and only two value fields. As a result, even though the slot 800B1 has claimed a portion of bits that are part of an adjacent slot for a particular combination of slot instructions (and/or slot opcodes), the slot 800B2 may include enough bits and/or fields to properly represent a slot instruction.

In one or more embodiments, the instruction set architecture may prevent conflicting combinations where adjacent slot instructions would both require particular bits of the VLIW. For example, a processor may disallow a slot instruction represented by the slot 800B1 to be paired with a slot instruction represented by the slot 800A2, where both slot instructions would require some of the same bits. A particular slot instruction for a particular slot may use more or less bits depending on which other slot instructions the particular slot instruction is paired with. The legal and illegal combinations may be determined based on the particular combination of slot opcodes (the opcodes of each slot).

It should be appreciated that in one or more embodiments, an instruction slot may extend into allocable bits that are not adjacent to the instruction slot. For example, instead of extending into allocable bits of the slot 800A2, the slot 800A1 may extend into allocable bits of the slot 800A3 or the slot 800A4.

Referring to FIG. 8B, the VLIW 800B may store a particular instruction word represented by the following instruction notation:

FMADD, f2, f4, f5, f6|0, r5, f3, LWLF|SWOF, f2, r4, 0|r3, r2, r2, AND

The instruction word will be discussed with reference to the processor core 300A of FIG. 3, but it should be appreciated that embodiments are not limited to core 300A. Fields leading with the letter "f" may denote a floating point register (e.g., stored in the FRF 314) and fields leading with the letter "r" may denote an integer register (e.g., stored in the GRF 312).

The slot instruction "r3, r2, r2, AND" may be represented by the slot 800B4, where fields of the slot instruction notation correspond to the fields of the slot 800B4. For example, the "AND" portion may correspond to the opcode 835 and the "r3, r2, r2" portions may correspond to the values 832-834, respectively. For example, the opcode 835 may indicate that the ALU 310 is to execute a logical bitwise "AND" operation using the values stored in registers r2 and r3, and to write the resulting value to register r2.

The slot instruction "SWOF, f2, r4, 0" may be represented by the fields of the slot 800B3. For example, the "SWOF" portion (which may represent a "store word" operation) may correspond to the opcode 829 and the "f2, r4" portions may correspond to the values 830-831, respectively. The opcode 829 may indicate that the LS1 324 is to write the value stored in register f2 to a memory location represented by the value stored in register r4.

Slots of some VLIWs may include a particular number of fields depending on the particular slot instruction. For example, the third slot may include four fields (e.g., the slot 800A3) for one slot instruction that may use or require four fields, while the third slot includes three fields (e.g., the slot 800B3) for a different slot instruction that may use or require three fields.

Slot instructions of some VLIWs may include a particular number of fields depending on the particular combination of slot instructions (e.g., based on the combination of slot opcodes). For example, a particular slot instruction for a particular slot may use more or less bits depending on which other slot instructions the particular slot instruction is paired/grouped with. In one example, the third slot of both the VLIWs 800A and 800B (i.e., the slots 800A3 and 800B3, respectively) may include the same opcode indicating the same type of operation. However, based on the combination of other opcodes in the VLIW, the slot 800A3 may include more fields and/or bits than the slot 800B3.

Accordingly, in the example discussing the particular VLIW above, the notation "SWOF, f2, r4, 0" includes an immediate value in the last field (i.e., an immediate "0") that will not be used in the actual VLIW, because in this particular combination of slot instructions, the relevant bits are included in the "AND" operation. However, in other slot instruction combinations, an immediate value in the last field of the "SWOF" slot instruction may be included in the VLIW and thereby involved in the operation of the "SWOF" slot instruction.

The slot instruction "0, r5, f3, LWLF" may be represented by the fields of the slot 800B2. For example, the "LWLF" portion (which may represent a "load word" operation) may correspond to the opcode 828 and the "r5, f3" portions may correspond to the values 826-827, respectively. The opcode 828 may indicate that the LS0 322 is to write the value stored in register r5 to register f3.

For similar reasons with respect to the slot 800B3, the notation "0, r5, f3, LWLF" for the slot 800B2 includes an immediate value in the first field (i.e., an immediate "0") that will not be used in the actual VLIW. Instead, the relevant bits are included in the "FMADD" operation.

The slot instruction "FMADD, f2, f4, f5, f6" may be represented by the fields of the slot 800B1. For example, the "FMADD" portion may correspond to the opcode 821 and the "f2, f4, f5, f6" portions may correspond to the values 822-825, respectively. The opcode 821 may indicate that the FPU 316 is to perform a fused multiply-add operation using the values stored in registers f4, f5, and f6, and to write the resulting value to register f2. For example, the FMADD operation includes multiplying the values stored in registers f4 and f5, adding the resulting product with the value stored in register f6, and writing the resulting value to register f2.

For the particular combination of slot opcodes for the particular example VLIW, the first slot of the VLIW 800B (i.e., the slot 800B1) may include more bits from an adjacent slot as compared to the first slot of the VLIW 800A (i.e., the slot 800A1). As a result, the "FMADD" slot instruction may include five fields (as opposed to four fields).

Performing a fused multiply-add operation is important, advantageous, and/or preferable for many operations in computing. In most architectures, a multiply operation requires 3 cycles to execute and an add operation requires 1 cycle to execute. Accordingly, in most architectures, a fused multiply-add combination of operations requires a total of 4 cycles to execute (3 cycles for a multiplication operation and 1 cycle for an addition operation). However, the architecture corresponding to one or more embodiments is capable of completing one FMADD operation in a total of 3 cycles.

Accordingly, indicating an FMADD operation is to be executed, in one instruction, is advantageous in some embodiments.

Such an FMADD operation may require five fields (one opcode, three operands fields, and one destination field). Embodiments allow for including or reallocating bits of an instruction to a particular slot from another slot to allow for longer slot instructions (e.g., five fields for an FMADD operation). Meanwhile, the adjacent slot may still be used to provide useful instructions to another functional unit, thereby avoiding a loss of performance with respect to other functional units or operations.

Referring to FIG. 8C, a VLIW 800C may store a particular instruction word represented by the following instruction notation:

FMUL, f2, f4, f5|−3, r5, f3, LWLF|SWOF, f2, r4, 0|5, r3, r2, ADDI

The slot instruction "5, r3, r2, ADDI" may be represented by a slot 800C4, where fields of the instruction notation correspond to the fields of the slot 800C4. For example, the "ADDI" portion may correspond to the opcode 855 and the "5, r3, r2" portions may correspond to the values 852-854, respectively. The opcode 855 may indicate that the ALU 310 is to execute an "add immediate unsigned" operation using the value stored in the register r3 and the immediate value of '5', and to write the resulting value to register r2.

Similarly, the slot instruction "SWOF, f2, r4, 0" may be represented by the fields of the slot 800C3. For example, the "SWOF" portion may correspond to the opcode 849 and the "f2, r4" portions may correspond to the values 850-851, respectively. The opcode 849 may indicate that the LS1 324 is to write the value stored in register f2 to a memory location represented by the value stored in register r4. The third slot of some instruction words may include four fields (e.g., the slot 800A3).

The slot instruction "−3, r5, f3, LWLF" may be similar to the slot instruction "0, r5, f3, LWLF" (discussed above). However, a nonzero signed immediate offset (i.e., "−3") is included. Because the slot instruction "−3, r5, f3, LWLF", corresponding to the second slot (the slot 800C2), includes a total of four fields, the slot instruction corresponding to the first slot (the slot 800C1) may not include enough bits to provide five total fields (e.g., like the slot 800B1 of FIG. 8B). As a result, the slot instruction corresponding to the first slot (the slot 800C1) may not include a five-field slot instruction (e.g., like the FMADD slot instruction). However, a four-field slot instruction may be included, like "FMUL, f2, f4, f5".

In one or more embodiments, the processor architecture avoids hazards by implementing a static scheduling policy. One example of a data hazard is a RAW (Read-After-Write) hazard, where a value is read from a register after a value is written to that register. This hazard occurs when a "read" operation uses an outdated value due to the writeback latency of a "write" operation. The VLIW architecture may implement static scheduling to prevent such hazards.

Consider again the particular instruction word represented by the following instruction notation:

FMADD, f2, f4, f5, f6|0, r5, f3, LWLF|SWOF, f2, r4, 0|r3, r2, r2, AND

The slot instruction "FMADD, f2, f4, f5, f6" will result in a value being written to the register f2. However, the slot instruction "SWOF, f2, r4, 0" involves reading a value that is stored by the register f2. If the FMADD operation writes to the register f2 before the SWOF operation reads the value, then a RAW hazard will occur.

In one or more embodiments, the writeback stage (where values may be written to memory locations such as registers) occurs sequentially/chronologically after the instruction decode stage (where register values are read). For that reason, continuing the example, the value from register f2 will be read for the SWOF operation represented in the slot 800B3 before a new value is written to register f2 by the FMADD operation represented in the slot 800B1.

In one or more embodiments, the Instruction Set Architecture (ISA) of the VLIW architecture avoids conflicts arising from read and write port requirements while optimizing the number of ports necessary. Consider again the particular instruction word represented by the following instruction notation:

FMADD, f2, f4, f5, f6|0, r5, f3, LWLF|SWOF, f2, r4, 0 r3, r2, r2, AND

The entire instruction word requires:
4 general purpose register file read ports (2+1+1+0),
1 general purpose register file write ports (1+0+0+0),
4 floating point register file read ports (0+1+0+3), and
2 floating point register file write ports (0+0+1+1).

Register files (e.g., GRF 312 and FRF 314) with 6 64-bit read ports and 2 64-bit write ports each will not cause a resource conflict. For that reason, the port count required by the instruction word would not make the instruction illegal.

Consider another VLIW, VLIW 800D of FIG. 8D, represented by the following instruction notation:

NOP_F|2, r3, f5, LWLF|LDOF, f3, r2, 0|NOP_A

The slot instructions NOP_F and NOP_A may instruct functional units (e.g., an ALU and FPU) that no operation is to be executed by those functional units.

The slot instruction "2, r3, f5, LWLF" may be represented by a slot 800D2, where fields of the instruction notation correspond to the fields of the slot 800D2. For example, the "LWLF" portion may correspond to the opcode 868 and the "2, r3, f5" portions may correspond to the values 865-867, respectively. The LWLF slot instruction may instruct a functional unit to load a 64-bit word to a floating point register file (e.g., the FRF 314).

The slot instruction "LDOF, f3, r2, 0" may be represented by a slot 800D3, where fields of the instruction notation correspond to the fields of the slot 800D3. For example, the "LDOF" portion may correspond to the opcode 869 and the "f3, r2" portions may correspond to the values 870-871, respectively. The LDOF slot instruction may instruct a functional unit to load a 128-bit double word to the same floating point register file (e.g., the FRF 314). As a result, even though no-operation instructions such as NOP_F and NOP_A are included in the instruction word, the entire instruction word requires 3 64-bit floating point register file write ports to handle 64 bits+128 bits. For that reason, the instruction word is illegal due to a resource hazard if the floating point register file only includes 2 write ports.

Figure 8E:
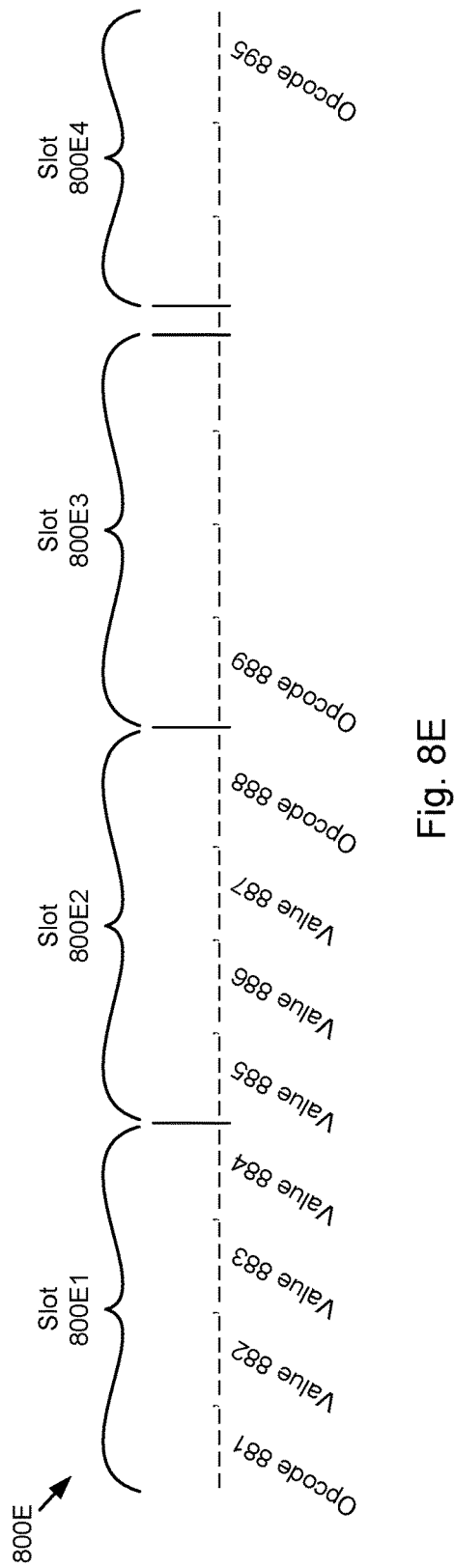

Consider another VLIW, VLIW 800E of FIG. 8E, represented by the following instruction notation:

FSUB f4, f5, f6|LDLF, f3, r2, 0

The slot instruction "FSUB f4, f5, f6" may be represented by a slot 800E1, where fields of the instruction notation correspond to the fields of the slot 800E1. For example, the "FSUB" portion may correspond to the opcode 881 and the "f4, f5, f6" portions may correspond to the values 882-884, respectively. The FSUB slot instruction may instruct a functional unit to load a 64-bit word to a floating point register file (e.g., the FRF 314).

The slot instruction "LDLF, f3, r2, 0" may be represented by a slot 800E2, where fields of the instruction notation correspond to the fields of the slot 800E2. For example, the "LDLF" portion may correspond to the opcode 888 and the "f3, r2, 0" portions may correspond to the values 885-887, respectively. The LDLF slot instruction may instruct a functional unit to load a 128-bit double word to the same floating point register file (e.g., the FRF 314). Here, 192 bits are to be written to the floating point register file (64 bits+128 bits) like the previous example. However, here, the architecture pipeline design and scheduling may be such that the execution of the FSUB operation requires one cycle fewer than the execution of the LDLF operation. As a result, the instruction word does not exceed 2 write ports in any single cycle and no resource hazard exists.

It should be appreciated that in one or more embodiments, bits of an opcode field may be partially or fully allocable. For example, bits that are used to represent an opcode in one VLIW may be used to represent value fields in another VLIW. In another example, bits that are used to represent an opcode in one VLIW may be used to augment another opcode field in another VLIW. Conversely, bits that are used to represent a value field in one VLIW may be used as opcode bits in another VLIW.

It should be appreciated that while FIGS. 8A-8D show 64-bit VLIWs with 4 slots, embodiments support other VLIW lengths and arrangements. For example, such a VLIW could have a length of 16 bits, 32 bits, 48 bits, 80 bits, 96 bits, 128 bits, or any other length. In another example, a VLIW could include 2 slots, 3 slots, 5 slots, and so on. It should also be appreciated that particular slots may or may not be dedicated to particular functional units. For example, based on a particular indication (e.g., particular opcode(s)), slot 800A1 may include instructions for the FPU 316 and slot 800A4 may include instructions for the ALU 310. But based on a different indication, slot 800A1 may include instructions for the ALU 310 and slot 800A4 may include instructions for the FPU 316.

In one or more embodiments, the opcode fields in each slot may be located such that they are at the ends of the VLIW and/or near the middle of the VLIW. For example, referring to FIG. 8A, the opcode 801 and the opcode 815 are located at edges of the slot 800A1, and the opcode 808 and the opcode 809 are located near the middle of the slot 800A1 (i.e., bits 29-33 and bits 34-38, respectively). As a result, the opcode positions may be static and/or predictable. Meanwhile, the slots may expand and contract at the boundary between the slot 800A1 and 800A2 and the boundary between the slot 800A3 and 800A4.

However, it should be appreciated that embodiments support other distributions of the opcode fields and value fields. In one example, each of the opcode fields may instead be located at the beginning of each respective instruction slot, while each of the value fields are located in the remainder of each respective instruction slot. In another example, all of the opcode fields may instead be located at the beginning of the VLIW (e.g., consecutively), while the value fields are located in the remainder of the VLIW.

Figure 9:
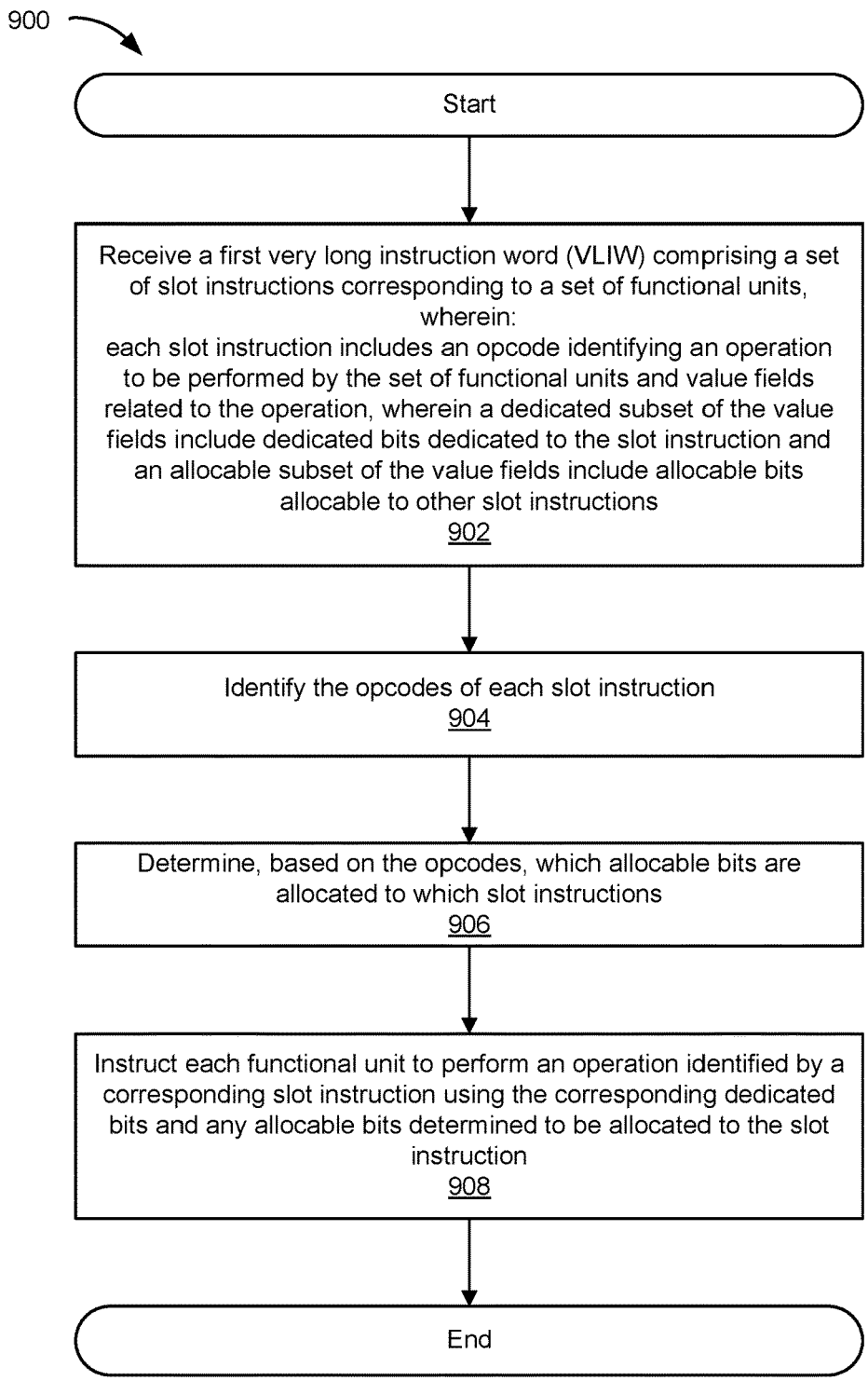
FIG. 9 shows a flowchart in accordance with one or more embodiments.

FIG. 9 shows a flowchart of a method for implementing VLIWs (e.g., in a processor core). While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 9 should not be construed as limiting the scope of the invention.

In STEP 902, a first very long instruction word (VLIW) including a set of slot instructions corresponding to a set of functional units is received. Each slot instruction may include an opcode identifying an operation to be performed by the set of functional units and value fields related to the operation, where a dedicated subset of the value fields include dedicated bits dedicated to the slot instruction and an allocable subset of the value fields include allocable bits allocable to other slot instructions. For example, the VLIW 800A including a set of slot instructions 800A1-800A4 corresponding to the functional units of the processor core 300A is received.

In STEP 904, the opcodes of each slot instruction are identified. Continuing the example, the opcodes 801, 808, 809, and 815 may be identified.

In STEP 906, based on the opcodes, which allocable bits are allocated to which slot instructions are determined. Continuing the example, it is determined to which slot the bits corresponding to value 805 are allocated (e.g., the second slot like slot 800A2 or the first slot like slot 800B1).

In STEP 908, each functional unit is instructed to perform an operation identified by a corresponding slot instruction using the corresponding dedicated bits and any allocable bits determined to be allocated to the slot instruction. Continuing the example, the functional units of the processor core 300A may be instructed to perform an operation based on the opcodes 801, 808, 809, and 815 and the remaining bits, based on their allocation to which slot.

While the present disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. Some of the steps may be performed simultaneously. For example, in certain circumstances, multitasking and parallel processing may be advantageous. The various example methods described and/or illustrated herein may also omit one or more of the steps described or illustrated herein or include additional steps in addition to those disclosed.

Embodiments may be implemented on a specialized computer system. The specialized computing system can include one or more modified mobile devices (e.g., laptop computer, smart phone, personal digital assistant, tablet computer, or other mobile device), desktop computers, servers, blades in a server chassis, or any other type of computing device(s) that include at least the minimum processing power, memory, and input and output device(s) to perform one or more embodiments.

Figure 10:
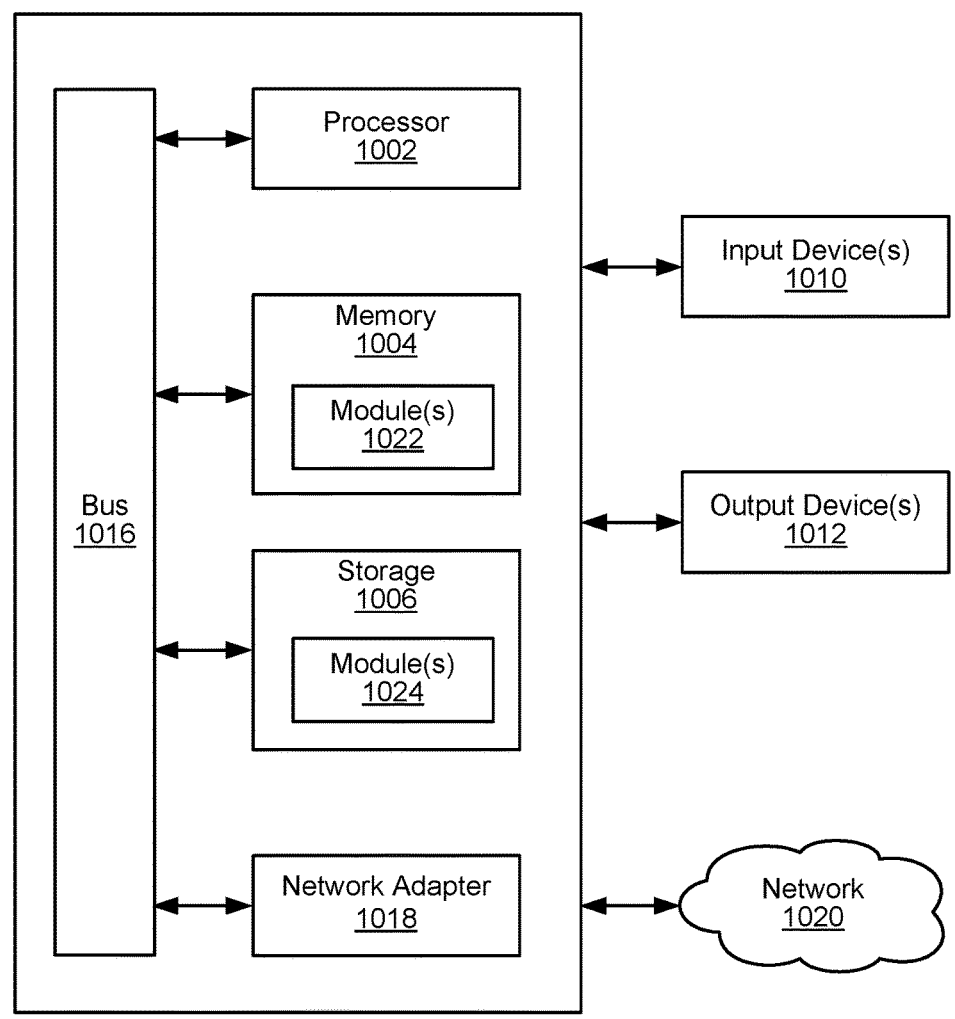
FIG. 10 shows a computer system in accordance with one or more embodiments.

For example, as shown in FIG. 10, the computing system 1000 may include one or more computer processor(s) 1002, associated memory 1004 (e.g., random access memory (RAM), cache memory, flash memory, etc.), one or more storage device(s) 1006 (e.g., a hard disk, an optical drive such as a compact disk (CD) drive or digital versatile disk (DVD) drive, a flash memory stick, etc.), a bus 1016, and numerous other elements and functionalities. The computer processor(s) 1002 may be an integrated circuit for processing instructions. For example, the computer processor(s) may be one or more cores or micro-cores of a processor.

In one or more embodiments, the computer processor(s) 1002 may be an integrated circuit for processing instructions. For example, the computer processor(s) 1002 may be one or more cores or micro-cores of a processor. The computer processor(s) 1002 can implement/execute software modules stored by computing system 1000, such as module(s) 1022 stored in memory 1004 or module(s) 1024 stored in storage 1006. For example, one or more modules can be stored in memory 1004 or storage 1006, where they can be accessed and processed by the computer processor 1002. In one or more embodiments, the computer processor(s) 1002 can be a special-purpose processor where software instructions are incorporated into the actual processor design.

The computing system 1000 may also include one or more input device(s) 1010, such as a touchscreen, keyboard, mouse, microphone, touchpad, electronic pen, or any other type of input device. Further, the computing system 1000 may include one or more output device(s) 1012, such as a screen (e.g., a liquid crystal display (LCD), a plasma display, touchscreen, cathode ray tube (CRT) monitor, projector, or other display device), a printer, external storage, or any other output device. The computing system 1000 may be connected to a network 1020 (e.g., a local area network (LAN), a wide area network (WAN) such as the Internet, mobile network, or any other type of network) via a network interface connection 1018. The input and output device(s) may be locally or remotely connected (e.g., via the network 1020) to the computer processor(s) 1002, memory 1004, and storage device(s) 1006.

One or more elements of the aforementioned computing system 1000 may be located at a remote location and connected to the other elements over a network 1020. Further, embodiments may be implemented on a distributed system having a plurality of nodes, where each portion may be located on a subset of nodes within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface.

One or more elements of the above-described systems may also be implemented using software modules that perform certain tasks. These software modules may include script, batch, routines, programs, objects, components, data structures, or other executable files that may be stored on a computer-readable storage medium or in a computing system. These software modules may configure a computing system to perform one or more of the example embodiments disclosed herein. The functionality of the software modules may be combined or distributed as desired in various embodiments. The computer readable program code can be stored, temporarily or permanently, on one or more non-transitory computer readable storage media. The non-transitory computer readable storage media are executable by one or more computer processors to perform the functionality of one or more components of the above-described systems and/or flowcharts. Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

It is understood that a "set" can include one or more elements. It is also understood that a "subset" of the set may be a set of which all the elements are contained in the set. In other words, the subset can include fewer elements than the set or all the elements of the set (i.e., the subset can be the same as the set).

While the invention has been described with respect to a limited number of embodiments, those skilled in the art, having benefit of this disclosure, will appreciate that other embodiments may be devised that do not depart from the scope of the invention as disclosed herein.

What is claimed is:

1. A system for implementing very long instruction words (VLIW), the system operable to:
   receive a first very long instruction word (VLIW) comprising a set of slot instructions corresponding to a set of functional units, wherein:
     each slot instruction includes an opcode identifying an operation to be performed by the set of functional units and value fields related to the operation, wherein a dedicated subset of the value fields include dedicated bits dedicated to the slot instruction and an allocable subset of the value fields include allocable bits allocable to other slot instructions;
   identify the opcodes of each slot instruction;
   determine, based on the opcodes, which allocable bits are allocated to which slot instructions; and
   instruct each functional unit to perform an operation identified by a corresponding slot instruction using the corresponding dedicated bits and any allocable bits determined to be allocated to the slot instruction.

2. The system of claim 1, wherein the system is further operable to:
   receive a second VLIW comprising a second set of slot instructions corresponding to the set of functional units;
   identify opcodes of the second set of slot instructions;
   determine, based on the opcodes of the second set of slot instructions, which allocable bits are allocated to which slot instructions, wherein the allocable bits are allocated differently from the first VLIW; and
   instruct each functional unit to perform an operation identified by a corresponding slot instruction of the second set of slot instructions using any allocable bits determined to be allocated to the slot instruction.

3. The system of claim 2, wherein:
   a slot instruction of the first VLIW corresponding to a particular functional unit includes two dedicated operand value fields and one dedicated output value field; and
   a slot instruction of the second VLIW corresponding to the particular functional unit includes three dedicated operand value fields and one dedicated output value field, wherein one of the three dedicated operand value fields is represented by allocable bits.

4. The system of claim 2, wherein the opcode bits of the first VLIW are in the same locations as the opcode bits of the second VLIW.

5. The system of claim 1, wherein the opcodes of the first VLIW are grouped such that no allocable bits are allocated to more than one slot instruction.

6. The system of claim 1, wherein the value fields comprise at least one selected from a group consisting of register address values, address offsets, immediate values, and flags.

7. The system of claim 1, wherein a subset of the opcode fields include allocable bits allocable to other slot instructions.

8. The system of claim 1, wherein the system is further operable to simultaneously instruct each functional unit to perform the operations corresponding to the first VLIW.

9. The system of claim 1, wherein the system is further operable to cause an instruction decode stage of the set of slot instructions to occur before a writeback stage of the operations corresponding to the set of slot instructions.

10. A method for implementing very long instruction words (VLIW), the method comprising:
receiving a first very long instruction word (VLIW) comprising a set of slot instructions corresponding to a set of functional units, wherein:
each slot instruction includes an opcode identifying an operation to be performed by the set of functional units and value fields related to the operation, wherein a dedicated subset of the value fields include dedicated bits dedicated to the slot instruction and an allocable subset of the value fields include allocable bits allocable to other slot instructions;
identifying the opcodes of each slot instruction;
determining, based on the opcodes, which allocable bits are allocated to which slot instructions; and
instructing each functional unit to perform an operation identified by a corresponding slot instruction using the corresponding dedicated bits and any allocable bits determined to be allocated to the slot instruction.

11. The method of claim 10, further comprising:
receiving a second VLIW comprising a second set of slot instructions corresponding to the set of functional units;
identifying opcodes of the second set of slot instructions;
determining, based on the opcodes of the second set of slot instructions, which allocable bits are allocated to which slot instructions, wherein the allocable bits are allocated differently from the first VLIW; and
instructing each functional unit to perform an operation identified by a corresponding slot instruction of the second set of slot instructions using any allocable bits determined to be allocated to the slot instruction.

12. The method of claim 11, wherein:
a slot instruction of the first VLIW corresponding to a particular functional unit includes two dedicated operand value fields and one dedicated output value field; and a slot instruction of the second VLIW corresponding to the particular functional unit includes three dedicated operand value fields and one dedicated output value field, wherein one of the three dedicated operand value fields is represented by allocable bits.

13. The method of claim 11 wherein the opcode bits of the first VLIW are in the same locations as the opcode bits of the second VLIW.

14. The method of claim 10, wherein the opcodes of the first VLIW are grouped such that no allocable bits are allocated to more than one slot instruction.

15. The method of claim 10, wherein the value fields comprise at least one selected from a group consisting of register address values, address offsets, immediate values, and flags.

16. The method of claim 10, wherein a subset of the opcode fields include allocable bits allocable to other slot instructions.

17. The method of claim 10, wherein each functional unit is simultaneously instructed to perform the operations corresponding to the first VLIW.

18. The method of claim 10, further comprising causing an instruction decode stage of the set of slot instructions to occur before a writeback stage of the operations corresponding to the set of slot instructions.

19. A non-transitory computer-readable storage medium comprising a plurality of instructions configured to execute on at least one computer processor to enable the at least one computer processor to:
receive a VLIW comprising a set of slot instructions corresponding to a set of functional units, wherein:
each slot instruction includes an opcode identifying an operation to be performed by the set of functional units and value fields related to the operation, wherein a dedicated subset of the value fields include dedicated bits dedicated to the slot instruction and an allocable subset of the value fields include allocable bits allocable to other slot instructions;
identify the opcodes of each slot instruction;
determine, based on the opcodes, which allocable bits are allocated to which slot instructions; and
instruct each functional unit to perform an operation identified by a corresponding slot instruction using the corresponding dedicated bits and any allocable bits determined to be allocated to the slot instruction.

20. The non-transitory computer-readable storage medium of claim 19, wherein the opcodes of the first VLIW are grouped such that no allocable bits are allocated to more than one slot instruction.

* * * * *